(12) United States Patent
Sengupta et al.

(10) Patent No.: US 12,386,850 B1
(45) Date of Patent: Aug. 12, 2025

(54) SYSTEMS AND METHODS TO CONVERT DATA ACCORDING TO A SCHEMA

(71) Applicant: EYGS LLP, London (GB)

(72) Inventors: Dipanjan Sengupta, West Bengal (IN); Samriddha Chatterjee, West Bengal (IN)

(73) Assignee: EYGS LLP, London (GB)

( * ) Notice: Subject to any disclaimer, the term of this patent is extended or adjusted under 35 U.S.C. 154(b) by 0 days.

(21) Appl. No.: 18/446,251

(22) Filed: Aug. 8, 2023

(51) Int. Cl.
  *G06F 16/30* (2019.01)
  *G06F 16/21* (2019.01)
  *G06F 16/22* (2019.01)
  *G06F 16/25* (2019.01)
  *G06F 21/62* (2013.01)

(52) U.S. Cl.
  CPC .......... *G06F 16/258* (2019.01); *G06F 16/212* (2019.01); *G06F 16/22* (2019.01); *G06F 21/6254* (2013.01)

(58) Field of Classification Search
  CPC ....... G06F 16/258; G06F 16/22; G06F 16/212
  See application file for complete search history.

(56) References Cited

U.S. PATENT DOCUMENTS

| | | |
|---|---|---|
| 5,717,924 A | 2/1998 | Kawai |
| 7,313,561 B2 | 12/2007 | Lo et al. |
| 7,707,493 B2 | 4/2010 | Vion-Dury et al. |
| 7,797,319 B2 | 9/2010 | Piedmonte |
| 7,895,568 B1 | 2/2011 | Goodwin et al. |
| 7,920,590 B2 | 4/2011 | Le et al. |
| 8,099,382 B2 | 1/2012 | Liu et al. |
| 8,321,478 B2 | 11/2012 | Fong |
| 8,412,746 B2 | 4/2013 | Fox et al. |
| 8,612,468 B2 | 12/2013 | Schloming |
| 9,244,706 B2 | 1/2016 | Calev et al. |
| 9,652,478 B2 | 5/2017 | Gupta |
| 9,787,322 B2 | 10/2017 | Strohm, III |
| 10,140,100 B2 | 11/2018 | Barnes et al. |

(Continued)

FOREIGN PATENT DOCUMENTS

| | | |
|---|---|---|
| CA | 2429907 A1 | 11/2004 |
| CA | 2468406 A1 | 11/2004 |

(Continued)

OTHER PUBLICATIONS

"AWS Schema Conversion Tool," Amazon Database Migration Service, 2 pages, Aug. 19, 2023, retrieved online at https://aws.amazon.com/dms/schema-conversion-tool/.

Primary Examiner — Khanh B Pham
(74) Attorney, Agent, or Firm — COOLEY LLP

(57) ABSTRACT

A method according to an embodiment includes receiving, at one or more processors, (1) first data that is structured according to a first schema and that includes a first representation of an entity and (2) an indication of a target schema. The method also includes generating, using the one or more processors, an elemental specification associated with the first data. The method also includes generating, using the one or more processors and based on (1) the elemental specification and (2) a translation specification associated with the target schema, second data structured according to the target schema, the second data including a second representation of the entity that is equivalent to the first representation of the entity.

18 Claims, 7 Drawing Sheets

(56) References Cited

U.S. PATENT DOCUMENTS

| | | |
|---|---|---|
| 10,242,016 B2 | 3/2019 | Gorelik |
| 10,324,908 B2 | 6/2019 | Kumar et al. |
| 10,372,424 B2 | 8/2019 | Evans et al. |
| 10,545,958 B2 | 1/2020 | Azzam et al. |
| 10,862,979 B2 | 12/2020 | Deraz et al. |
| 10,983,969 B2 | 4/2021 | Krishnan et al. |
| 11,138,206 B2 | 10/2021 | Siebeking et al. |
| 11,153,435 B2 | 10/2021 | Grabowski et al. |
| 11,163,762 B2 | 11/2021 | Arnold et al. |
| 11,200,037 B1 | 12/2021 | Mann et al. |
| 11,405,615 B2 | 8/2022 | Yea et al. |
| 11,409,802 B2 | 8/2022 | Miranker et al. |
| 11,483,428 B2 | 10/2022 | Grabowski et al. |
| 11,520,565 B2 | 12/2022 | Langdon |
| 11,546,448 B2 | 1/2023 | Entelis et al. |
| 2003/0131144 A1 | 7/2003 | Weaver |
| 2004/0008650 A1 | 1/2004 | Le et al. |
| 2004/0181538 A1 | 9/2004 | Lo et al. |
| 2005/0050068 A1* | 3/2005 | Vaschillo .............. G06F 16/25 |
| 2005/0223413 A1* | 10/2005 | Duggan ............ G06F 21/6236 |
| | | 726/3 |
| 2005/0234889 A1 | 10/2005 | Fox et al. |
| 2006/0085451 A1 | 4/2006 | Pal et al. |
| 2006/0200438 A1 | 9/2006 | Schloming |
| 2007/0276787 A1 | 11/2007 | Piedmonte |
| 2008/0120316 A1 | 5/2008 | Vion-Dury et al. |
| 2008/0256121 A1 | 10/2008 | Liu et al. |
| 2008/0320023 A1 | 12/2008 | Fong |
| 2009/0177672 A1* | 7/2009 | Fagin .................. G06F 16/284 |
| 2010/0049728 A1* | 2/2010 | Chiticariu ............ G06F 16/258 |
| | | 707/E17.044 |
| 2010/0131923 A1 | 5/2010 | Oon |
| 2011/0296373 A1 | 12/2011 | Calev et al. |
| 2012/0095957 A1 | 4/2012 | Reddy et al. |
| 2015/0347472 A1 | 12/2015 | Gupta |
| 2016/0342597 A1 | 11/2016 | Azzam et al. |
| 2017/0039260 A1* | 2/2017 | Adya ..................... G06F 16/27 |
| 2017/0060894 A1 | 3/2017 | Gorelik |
| 2017/0126246 A1 | 5/2017 | Strohm, III |
| 2017/0255452 A1 | 9/2017 | Barnes et al. |
| 2018/0060366 A1 | 3/2018 | Kumar et al. |
| 2018/0295194 A1 | 10/2018 | Deraz et al. |
| 2018/0329688 A1 | 11/2018 | Evans et al. |
| 2020/0201865 A1 | 6/2020 | Siebeking et al. |
| 2020/0265025 A1 | 8/2020 | Krishnan et al. |
| 2021/0019310 A1 | 1/2021 | Arnold et al. |
| 2021/0092228 A1 | 3/2021 | Grabowski et al. |
| 2021/0109720 A1 | 4/2021 | Langdon |
| 2021/0224330 A1 | 7/2021 | Miranker et al. |
| 2021/0282050 A1 | 9/2021 | Adjakple et al. |
| 2021/0306634 A1 | 9/2021 | Yea et al. |
| 2022/0046126 A1 | 2/2022 | Grabowski et al. |
| 2022/0116755 A1 | 4/2022 | Filippou et al. |
| 2022/0224777 A1 | 7/2022 | Entelis et al. |
| 2022/0386204 A1 | 12/2022 | Parichehrehterouj et al. |
| 2023/0229639 A1* | 7/2023 | McCreary .............. G06N 5/022 |
| | | 707/756 |

FOREIGN PATENT DOCUMENTS

| | | |
|---|---|---|
| CA | 2636091 A1 | 7/2007 |
| CA | 2645715 A1 | 11/2007 |
| CN | 105594251 A | 5/2016 |
| CN | 105594251 B | 7/2019 |
| CN | 110692048 A | 1/2020 |
| EP | 1482430 A2 | 12/2004 |
| EP | 1515251 A1 | 3/2005 |
| EP | 1482430 A3 | 6/2006 |
| EP | 2008206 A1 | 12/2008 |
| EP | 1515251 B1 | 3/2010 |
| EP | 2008206 A4 | 4/2010 |
| EP | 2008206 B1 | 10/2011 |
| WO | WO-2008085821 A2 | 7/2008 |
| WO | WO-2008085821 A3 | 9/2008 |
| WO | WO-2020149990 A1 | 7/2020 |
| WO | WO-2020170237 A1 | 8/2020 |
| WO | WO-2021209907 A1 | 10/2021 |
| WO | WO-2022031199 A1 | 2/2022 |
| WO | WO-2022189972 A1 | 9/2022 |
| WO | WO-2022190065 A1 | 9/2022 |
| WO | WO-2022269567 A1 | 12/2022 |

\* cited by examiner

700

Receive a request from a user to convert data from an initial format to a target format
702

Reference specification document(s) to identify portion(s) of the data to include in a target file that complies with the target format
704

Reference the specification document(s) to identify additional data to include in the target file
706

Output the target format-compliant target file
708

FIG. 7

SYSTEMS AND METHODS TO CONVERT DATA ACCORDING TO A SCHEMA

FIELD

The embodiments described herein relate to systems and computerized methods for converting data between schemas.

BACKGROUND

Data can be represented according to a plurality of schemas. As such, it can be desirable to have systems configured to generate data that is arranged according to a desired schema.

SUMMARY

In an embodiment, a method includes receiving, at one or more processors, (1) first data that is structured according to a first schema and that includes a first representation of an entity, and (2) an indication of a target schema. The method also includes generating, using the one or more processors, an elemental specification associated with the first data, the elemental specification defining at least one of (1) a datatype property, (2) a constraint property, (3) a relationship property, (4) an immutability property, (5) a data security property, (6) an indexing property, or (7) a feature matrix and an indication of a neural network to use the feature matrix. The method also includes generating, using the one or more processors and based on (1) the elemental specification and (2) a translation specification associated with the target schema, second data structured according to the target schema, the second data including a second representation of the entity that is equivalent to the first representation of the entity.

BRIEF DESCRIPTION OF THE DRAWINGS

FIG. 7 is a flowchart showing a method of using a schema conversion system to generate a file according to a target format, according to an embodiment.

DETAILED DESCRIPTION

Figure 1:
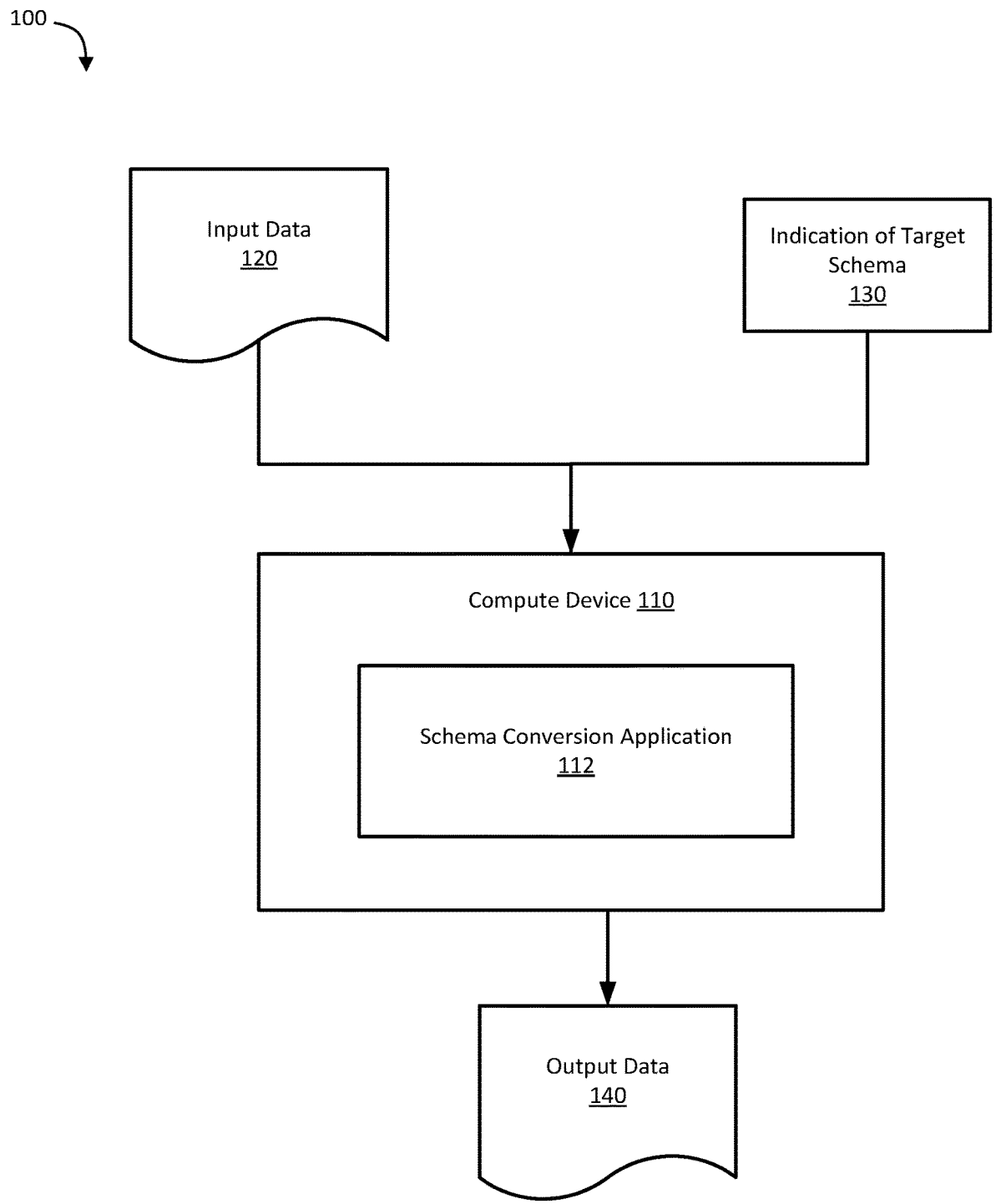
FIG. 1 is a schematic diagram of a schema conversion system, according to an embodiment.

FIG. 1 is a schematic diagram of a schema conversion system 100, also referred to herein as "a system," for converting data arranged according to different schemas, according to an embodiment. The schema conversion system 100 includes a compute device 110 that receives a plurality of inputs from a user. In some instances, these inputs can include, for example, input data 120 and a target schema indication 130. In some implementations, based on these inputs, the compute device 110 can include a schema conversion application 112, such that the compute device 110 is configured to cause the generation of output data 140.

The compute device 110 can include, for example, a hardware-based computing device, a multimedia device, or a cloud-based device, such as, for example, a computer device, a server, a desktop compute device, a laptop, a smartphone, a tablet, a wearable device, a remote computing infrastructure, and/or the like. In some implementations, the compute device 110 can be configured to execute (e.g., via a processor) the schema conversion application 112 to modify the input data 120, such that the resulting modified data (e.g., the output data 140) is structured according to a schema associated with the target schema indication 130, as described herein.

A schema can be, for example, a standardized and/or pre-defined structure for arranging data that is to be stored and/or transmitted. For example, a schema can include a logical representation of data (e.g., a representation of how data is related to, and stored relative to, other data). In some implementations, a schema can include a syntactic framework (e.g., a definition of notation to define a structure of data) and/or a semantic framework (e.g., a definition of any ambiguous interpretations of data between, for example, a producer of that data and a consumer of that data). In some implementations, a schema can define a data contract that stipulates how data can be represented and/or modified, as described herein. In some implementations, a schema can include metadata (e.g., machine readable code) that is configured to define a structure of data. In some implementations, a schema can be used to encode (e.g., represent through machine-readable code) a virtual model and/or a virtual entity, as described herein.

The input data 120 can include a collection of information that represents, for example, a virtual model and/or a virtual entity. In some implementations, a virtual model and/or a virtual entity (e.g., a virtual and/or digital representation of a person, product, and/or organization) can be associated with an object, a type, and/or a physical entity (e.g., a person, a product, and/or an organization) that exists in the real world. In some instances, the input data 120 can include one or more elements that define a trait(s) and/or a behavior(s) associated with the virtual model and/or the virtual entity. These one or more elements can include, for example, an attribute element that can define a set of attribute(s) that specify characteristic(s) of a virtual model, virtual entity, and/or the like. In some instances, the one or more elements can include a datatype element that can define an in-memory representation of a virtual model, virtual entity, and/or the like. For example, the datatype element can specify a desired byte allocation strategy, a desired value range, and/or a desired value format (e.g., an integer, string, character, Boolean, and/or the like), associated with value(s) included in the input data 120. The value(s) can be associated with a primitive datatype and/or a complex datatype.

In some implementations, the one or more elements can include a constraint element that can define a set of limitation(s) associated with the virtual model, virtual entity, and/or the like. In some implementations, the constraint element can be configured for use in an optimization technique. In some implementations, a constraint element can define a virtual constraint that includes, for example, a datatype validation constraint, a NOT NULL constraint, a CHECK constraint, and/or the like. In some implementations, a constraint element can define a key constraint that includes, for example, a unique key, a candidate key, and/or the like. In some implementations, a constraint element can define an entity integrity constraint (i.e., a primary key constraint) that is configured to maintain the integrity of the virtual model, virtual entity, and/or the like. In some implementations, a constraint element can define a referential integrity constraint. A referential integrity constraint can include, for example, a foreign key constraint that is configured to maintain the referential integrity of the virtual model, virtual entity, and/or the like. In some implementations, the input data 120 can be associated with, for example, a RESTful data exchange. The input data 120 can be arranged according to a JSON schema that is configured to define at least one constraint on the input data 120. The at least one constraint can be applied, at least in part, via a property definition, an attribute requirement, a pattern property, a length-based constraint, an enumeration, a constant, and/or the like. The at least one constraint can be further applied, at least in part, via a schema composition (e.g., a schema that includes attribute(s) such as allOf, anyOf, not, a combination thereof, and/or the like).

In some implementations, the one or more elements can include a relationship element that defines an aspect(s) of the virtual model, virtual entity, and/or the like. In some implementations, a relationship element can be associated with an object-oriented interpretation of data, a relational database-centric interpretation of data, a graph database, a hierarchical database, a network database, and/or the like, as discussed herein. Examples of relationships defined by a relationship element that is associated with an object-oriented interpretation of data can include an inheritance relationship (e.g., IS-A), a dependency relationship, an association relationship, an aggregation relationship (e.g., HAS-A), a composition relationship (e.g., PART-OF), and/or an interface realization relationship. An inheritance relationship can cause a virtual entity to acquire properties and/or behaviors of another virtual entity. A dependency relationship can cause one virtual entity to be associated, at least temporarily, with another virtual entity. An association relationship can include, for example, a structural relationship associated with two or more virtual entities. For example, the structural relationship can result from the structural relationship being defined within data included in two or more virtual entities. An aggregation relationship can include a subset of an association relationship that, for example, defines (1) that a first entity is owned by a second entity and (2) that the first entity can exist independently of the second entity. A composition relationship can include a subset of an association relationship that, for example, defines (1) that a first entity is owned by a second entity and (2) that the first entity does not exist independently of the second entity. An interface realization relationship can cause, for example, a virtual entity to conform to a contract defined by an interface associated with that virtual entity.

Examples of relationships defined by a relationship element that is associated with a relational database-centric interpretation of data can include a one-to-one relationship (e.g., 1:1), a one-to-many relationship (e.g., 1:n), and/or a many to many relationship (e.g., n:n). A one-to-one relationship can define, for example, an association between two virtual entities. A one-to-many relationship can define, for example, a relationship from one virtual entity to a plurality of virtual entities and/or a relationship from a plurality of virtual entities to one virtual entity. A many-to-many relationship can define, for example, a relationship between a first virtual entity and a second virtual entity in many-to-many cardinality. For example, through a many-to-many relationship, multiple records in a first table can be associated with multiple records in a second table.

Examples of relationships defined by a relationship element that is associated with a graph database can include a connection between a source node and a target node included in the graph database. These relationships can have an associated direction, type attribute (i.e., classification), and/or a key-value pair(s) that describes the relationship. Examples of relationships defined by a relationship element that is associated with a hierarchal database can include a parent-child relationship and/or parent-children relationships. Examples of relationships defined by a relationship element that is associated with a network database can include a virtual entity that has a plurality of parents. For example, a network can include nodes arranged according to m:n cardinality.

In some implementations, the one or more elements can include an immutability element that can define an immutability characteristic(s) of a virtual model, a virtual entity, and/or the like. For example, the virtual model and/or virtual entity can include one or more properties that can be changed and/or one or more properties that cannot be changed. In some implementations, an entity can include an immutable attribute that remains unchanged throughout the lifecycle of the entity. An entity can also include a mutable attribute that can change during the lifecycle of the entity.

In some implementations, the one or more elements can include an obfuscation element that can be configured to obfuscate sensitive and/or security-related attribute(s) and/or data included in a virtual model and/or virtual entity. An obfuscation element can cause an attribute and/or data to be obfuscated through masking (e.g., replacing and/or switching part of the data), encryption (e.g., using a cryptographic algorithm to encrypt the data), and/or tokenization (e.g., replacing certain parts of the data with random and/or meaningless values).

In some implementations, the one or more elements can include an indexing element that can cause an attribute included in a virtual model and/or virtual entity to be searchable through a search operation. In some implementation, the one or more elements can include a cognitive facet element that can define a feature(s) of a virtual model, virtual entity, and/or the like that are associated with cognitive aspects. For example, these cognitive aspects can include machine learning algorithm types, training datasets, and/or the like that are associated with the virtual model, the virtual entity, and/or the like. These machine learning algorithm types and/or training datasets can be used to perform a machine-learning-based operation on the virtual model and/or virtual entity, such as image recognition, natural language processing, voice recognition, and/or the like.

A virtual model and/or entity can be associated with a plurality of spatial representations. These spatial representations can each be associated with a schema that includes at least one of the one or more elements described above and that has a structure (i.e., format) that is associated with that schema. An entity can be associated with at least one spatial representation during the entity's lifecycle, where each spatial representation is associated with a different schema. Examples of spatial representations can include an entity-at-design-time representation, an entity-in-transit representation, an entity-at-rest representation, an entity-as-an-event-stream representation, an entity-in-a-relational-database representation, an entity-in-a-graph-database representation, an entity-in-a-data-warehouse representation, an entity-in-a-semantic-web representation, an entity-in-a-user-interface representation, an entity-as-an-image representation, an entity-as-speech representation, and/or an entity-as-natural-language representation.

An entity-at-design-time representation can be defined, for example, using notation associated with the Unified Modelling Language (UML). In some implementations, the entity-at-design-time representation can provide a graphical description of a virtual entity. In some implementations, the entity-at-design-time representation can exclude a schema definition.

An entity-in-transit representation can be structured according to, for example, (1) a JSON schema when the entity is to be used in a RESTful-based data exchange, (2) an XML schema when the entity is to be used in a SOAP-based data exchange, and/or (3) a Protocol Buffer schema when the entity is to be used in a gRPC-based data exchange. These JSON, XML, and/or Protocol Buffer schemas (i.e., meta schemas) can be configured to ensure integrity of data associated with the virtual entity.

An entity-at-rest representation can be persisted through one or more files and/or object-based storages and can be structured according to, for example, a JSON schema, an Apache Avro® schema, and/or a Apache Parquet® schema.

An entity-as-an-event-stream representation can include a representation of a virtual model and/or a virtual entity, that is expressed as an event stream when the virtual model and/or the virtual entity is in transit between event producer(s) and event consumer(s). In some implementations, a cloud native application that is configured to use an entity having an entity-as-an-event-stream representation can include an event sourcing pattern. The event sourcing pattern can be configured to cause the virtual model and/or the virtual entity to have at least one of an event type, a mutable set of attributes, and/or a direction of change while the virtual model and/or the virtual entity is in transit.

An entity-in-a-relational-database representation can be defined by notation associated with a Data Definition Language and can be configured to represent a virtual model and/or a virtual entity in a relational database system. An entity-in-a-graph-database representation can be defined by notation associated with a Graph Query Language and can be configured to create relationships among nodes (e.g., virtual models and/or virtual entities). An entity-in-a-data-warehouse representation can be defined by notation associated with a Data Definition Language associated with a hierarchal database(s) (e.g., IBM® IMS). This notation can include a meta schema for data warehouse nodes (e.g., virtual models and/or virtual entities). An entity-in-a-semantic-web representation can be defined by notation associated with a Resource Descriptor Framework (RDF). An RDF can include one or more vocabulary standards that are configured to depict virtual models and/or virtual entities and their relationships. Examples of these vocabulary standards can include The Simple Knowledge Organization System (SKOS) and/or Web Ontology Language (OWL). An entity-in-a-user-interface representation can include a wireframe (e.g., a wireframe associated with Figma®) that can depict a virtual model and/or a virtual entity in a web-based user interface and/or a mobile-based user interface. An entity-as-an-image representation can depict a virtual model and/or a virtual entity as a binary image that is formatted according to, for example, a .jpeg and/or a .png format. An entity-as-speech representation can depict a virtual model and/or a virtual entity as a binary image that is formatted according to, for example, a .mp3 format and/or a .mov format. An entity-as-natural-language representation can include a textual representation of a virtual model and/or a virtual entity and can be associated with one or more languages and/or one or more locales.

In some implementations, one spatial representation can include at least one element from the one or more elements discussed herein, and a second spatial representation can exclude that at least one element. In some implementations, both a first spatial representation and a second spatial representation can exclude at least one element from the one or more elements discussed herein. In some implementations, an element included in a first spatial representation can have a different syntax and/or semantics than a same element included in a second spatial representation. As a result of at least one of these differences between spatial representations, a schema conversion application (e.g., the schema conversion application 112 described herein) can be configured to translate representation(s) of element(s) between spatial representations without loss and/or corruption of data associated with these elements, as described herein.

The target schema indication 130 can include a user-provided input that indicates a schema associated with the output data 140. In some implementations, the target schema indication 130 can include an indication of a file standard that specifies a format and/or structure for data within a file. In some implementations, the target schema indication 130 can indicate a schema that is different from the schema associated with the input data 120. The target schema indication 130 can indicate a schema that includes, for example, a system of notation (i.e., a standardized data model) for organizing and/or formatting data. In some implementations, these systems of notation can be configured for representing data according to one or more spatial representations described herein. Such systems of notation can include, for example, JavaScript object notation (JSON), comma-separated values (CSV), XML, Apache Avro®, protocol buffers (e.g., protobuf), Apache Parquet™, optimized row columnar (ORC), and/or the like. The compute device 110 can use the target schema indication 130 to generate (e.g., via a processor) the output data 140, as discussed herein.

In use, the compute device 110 can generate the output data 140 based on the input data 120 and the target schema indication 130. The output data 140 can be associated with a target schema based on the target schema indication 130, and this target schema can be different than the schema associated with the input data 120. In some implementations, the output data 140 can include a target file that is formatted according to a file standard (e.g., a file standard that specifies a format and/or structure for data within the file and that is associated with the target schema indication 130). The output data 140 can include a first representation of a virtual entity, the virtual entity being equivalent to a virtual entity represented by the input data 120. In some implementations, the output data 140 can represent a virtual entity according to a spatial representation that is different from the spatial representation of the virtual entity indicated by the input data 120. In some implementations, a difference(s) between the spatial representation associated with the input data 120 and the spatial representation associated with the output data 140 can be a result of difference(s) between an element(s) defined by the input data 120 and an element(s) defined by the output data 140. For example, a virtual model and/or a virtual entity might be represented as a conceptual data model using, for example, entity relationship diagrams (ERD) and/or UML diagrams. An engineering team may desire to translate this conceptual model to a different spatial representation that is associated with a different schema (e.g., an SQL file that includes a set of Data Definition Language (DDL) statement(s), a JSON schema, an Apache Avro® schema, and/or a Apache Parquet® schema). The engineering team can use the schema conversion system 100 to represent the virtual model and/or the virtual entity in multiple spatial representations and without loss of data integrity. Each of these different spatial representations can define different integration points for accessing the underlying virtual model and/or virtual entity. Using the schema conversion system 100 to generate different spatial representations of the virtual model and/or the virtual entity can, therefore, increase discoverability of the virtual model and/or the virtual entity.

Figure 2:
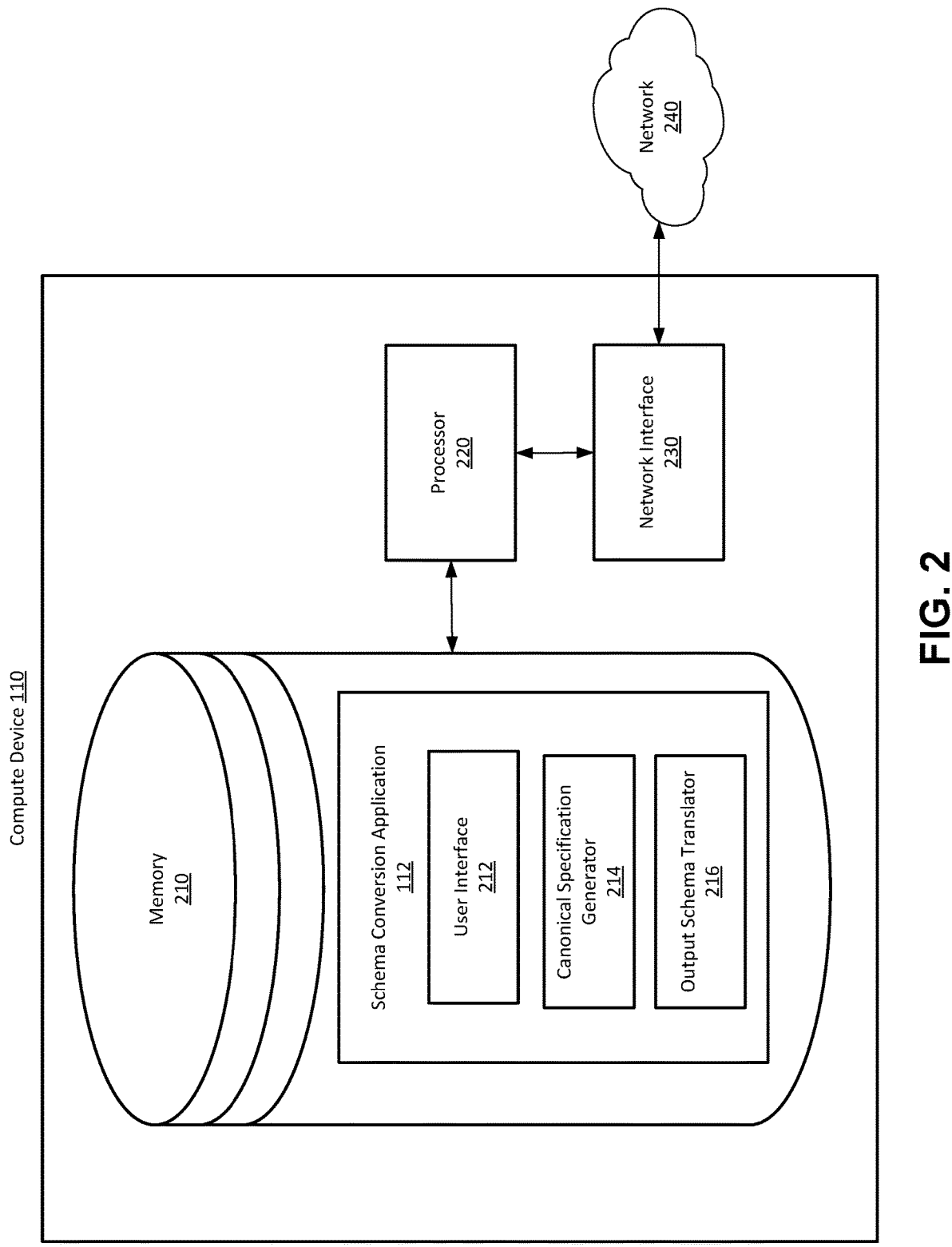
FIG. 2 is a schematic diagram of a compute device included in a schema conversion system, according to an embodiment.

FIG. 2 is a schematic diagram of the compute device 110 from the schema generation system 100 shown in FIG. 1, according to an embodiment. The compute device 110 can be a hardware-based computing device, a multimedia device, or a cloud-based device, such as, for example, a computer device, a server, a desktop compute device, a laptop, a smartphone, a tablet, a wearable device, a remote computing infrastructure, and/or the like. The compute device 110 can include a memory 210, a processor 220, and a network interface 230 configured to interface with a network 240.

The processor 220 can be, for example, a hardware based integrated circuit (IC), or any other suitable processing device configured to run and/or execute a set of instructions or code. For example, the processor 220 can be a general-purpose processor, a central processing unit (CPU), an accelerated processing unit (APU), an application specific integrated circuit (ASIC), a field programmable gate array (FPGA), a programmable logic array (PLA), a complex programmable logic device (CPLD), a programmable logic controller (PLC), a remote cluster of one or more processors associated with a cloud-based computing infrastructure and/or the like. The processor 220 is operatively coupled to the memory 210 (described herein). In some embodiments, for example, the processor 220 can be coupled to the memory 210 through a system bus (for example, address bus, data bus and/or control bus). The memory 210 can be, for example, a random-access memory (RAM), a memory buffer, a hard drive, a read-only memory (ROM), an erasable programmable read-only memory (EPROM), and/or the like. The memory 210 can store, for example, one or more software modules and/or code that can include instructions to cause the processor 220 to perform one or more processes, functions, and/or the like (e.g., those associated with the code compliance application, as described herein). In some implementations, the memory 210 can be a portable memory (e.g., a flash drive, a portable hard disk, and/or the like) that can be operatively coupled to the processor 220. In some implementations, the memory can be remotely operatively coupled with the compute device 110, for example, via the network interface 230. For example, a remote database server can be operatively coupled to the compute device 110.

In some implementations, the memory 210 can include the schema conversion application 112. In some implementations, the schema conversion application 112 can include software code stored in the memory 210 and executable by the processor 220. In some implementations, the schema conversion application 112 can include hardware components. In some implementations, although not shown in FIG. 2, the schema conversion application 112 can be included in a memory that is operatively connected to the compute device 110 (e.g., via a network 240, as discussed herein).

The code compliance application 112 can include a user interface 212, a canonical specification generator 214, and an output schema translator 216. The schema conversion application 112 can be configured to generate output data (e.g., the output data 140 of FIG. 1) that is formatted according to a desired schema (e.g., a schema associated with the target schema indication 130 of FIG. 1), as described herein.

The user interface 212 can be configured to accept a set of inputs from a user of the compute device 110. The set of inputs can include, for example, the input data 120 and/or the target schema indication 130, as described in relation to FIG. 1. In some instances, the user interface 212 can include, for example, a RESTful interface, a command line interface, a programmable interface, a graphical user interface (GUI), and/or the like. A RESTful interface can be associated with a representational state transfer (REST) architectural style configured to manage network-based application behavior. A RESTful interface can include, for example, an application programming interface (API) configured to exchange data over a network (e.g., the network 240), the data including the input data 120 and/or the target schema indication 130. In some instances, the command line interface can include, for example, an interface (e.g., a terminal, shell, and/or the like) configured to interact with the schema conversion application 112 based on text inputs from a user. In some instances, the programmable interface can include, for example an API that is configured to facilitate communication between the schema conversion application 112 and an external application, the external application configured to provide the input data 120 and/or the target schema indication 130 to the schema conversion application 112. In some implementations, the user interface 212 can be configured to provide an SQL and/or an SQL-like interface to transform data between different schemas for different spatial representations.

The canonical specification generator 214 can be configured to generate a canonical specification (e.g., the canonical specification 302, as described herein) that can define and/or codify element(s) (e.g., principal aspects) of a virtual entity for a plurality of schemas. In some implementations, the canonical specification generator can generate the canonical specification using one or more translation matrices that can bi-directionally map elements between a schema (e.g., a schema associated with the input data 120 of FIG. 1) and the canonical specification, as described herein in relation to, for example, FIG. 3. In some implementations, the canonical specification can define a plurality of variations of an element and/or an attribute of a virtual model and/or a virtual entity, each variation being associated with a different schema. In some implementations, the canonical specification can be globally standardized (as to a plurality of schemas) to facilitate lossless and/or substantially lossless interoperability among at least some schemas from the plurality of schemas. As described herein, different schemas can vary in at least one of the following aspects: (1) a structural representation of an entity property, (2) a datatype associated with an entity property, (3) syntax and/or semantics of a constraint associated with an entity, (4) syntax and/or semantics of a defined relationship associated with an entity, (5) an immutable property associated with an entity, and/or (6) an indexable property associated with entity. In some implementations, the canonical specification can include and/or interface with a set of pluggable specification(s) (e.g., the pluggable specification 304 of FIG. 3) that each can be configured to generate output data (e.g., the output data 140) that is depicted according to a different spatial representation. In some implementations, the canonical specification can be a source of truth for team(s) within an organization that use (e.g., write data to and/or read data from) a virtual entity. In some implementations, the canonical specification can define a data type property, a syntactic constraint, a relationship property, an immutability property, a data security property, an indexing property, and/or a machine learning property, as discussed herein in relation to, for example, FIG. 4. In some implementations, the canonical specification can include one or more elemental specifications that each is associated with a different element, as discussed herein.

The output schema translator 216 can be configured to generate output data (e.g., the output data 140 of FIG. 1) based on (1) the canonical specification generated by the canonical specification generator 214 and (2) the input data (e.g., the input data 120 of FIG. 1) received via the user interface 212. In some implementations, the output schema translator 216 can use a pluggable specification that is associated with a schema (e.g., a schema indicated by the target schema indication 130 of FIG. 1) to convert a globally (as to at least two schemas) standardized representation of a virtual entity (e.g., as represented in the canonical specification) to a representation of the virtual entity according to a desired schema. For example, a pluggable specification can interface with the canonical specification to provide a mapping of semantics for generating a schema that is associated with the target schema indication 130. In some implementations, the pluggable specification can include a spatial translation specification that further includes one or more spatial translation matrices. Each of the one or more spatial translation matrices can be configured to provide bi-directional, lossless translation between representations of a virtual entity in the canonical specification and a schema specific to a particular spatial representation, as described herein.

The network interface 230 can include one or more network interface controllers. These one or more network interface controllers can be one or more I/O (i.e., input/output) devices that are configured to transfer data to and/or from the processor 220 (e.g., via one or more buses supported by the processor 220). The one or more network interface controllers can be further configured to transfer the data to and/or from a network 240 that includes, for example, the Internet, an intranet, a local area network (LAN), a wide area network (WAN), a metropolitan area network (MAN), a worldwide interoperability for microwave access network (WiMAX®), an optical fiber (or fiber optic)-based network, a Bluetooth® network, a virtual network, and/or any combination thereof. The one or more network interface controllers can be configured based on one or more network protocols, such as Ethernet®, Infiniband®, OC48/OC192, ATM, SONET, and 802.11. In some instances, the one or more network interface controllers 240 can be configured to support a network storage protocol, such as, for example, Internet Small Computer Systems Interface (iSCSI), Fibre Channel (FC), Fibre Channel over Ethernet (FCoE), Network File System (NFS) or Server Message Block (SMB). In some instances, the one or more network interface controllers can include, for example, a network interface card (NIC), a Wi-Fi™ module, a Bluetooth® module and/or any other suitable wired and/or wireless communication device.

In some instances, the network interface 230 can facilitate receiving and/or transmitting data, including data associated with a cloud-native application. For example, the network interface 230 can be configured to receive a series of user inputs (e.g., the input data 120 and/or the target schema indication 130) via the user interface 212. In some instances, although not shown in FIG. 2, the network interface 230 can be configured to send output data (e.g., the output data 140 of FIG. 1) generated by the schema conversion application 112 to a memory (not shown) that is operatively coupled to the compute device 110 via the network 240. In some instances, the network interface 230 can be configured to deploy the output data 140 of FIG. 1 to a cloud environment associated with the network 240, the cloud environment being associated with, for example, a remote database (not shown). In some implementations, the output data 140 can include a generated JSON schema can be directly embedded into an industry standard file (e.g., OpenAPI® Specification (V2/V3)), which in turn can be used to expose a RESTful service via the network interface 230 and/or the network 240. In some implementations, the output data 140 can include a generated XML Schema Definitions that can be embedded within Web Services Description Language (WSDL) document(s) to expose a Simple Object Access Protocol (SOAP)-based service via the network interface 230 and/or the network 240. In some implementations, the output data 140 can include a Protobuf schema that can be used to generate gRPC based service object models. In some implementations, the output data 140 can include a schema (e.g., a schema file associated with Apache Avro®, Apache Parquet® and/or JSON) to be used by extract, transport, a load (ETL) analytics job(s) to validate the integrity of processed data. In some implementations, the output data 140 can include schema file(s) to be used within a schema registry of a streaming solution to validate messages and/or events being streamed.

Figure 3:
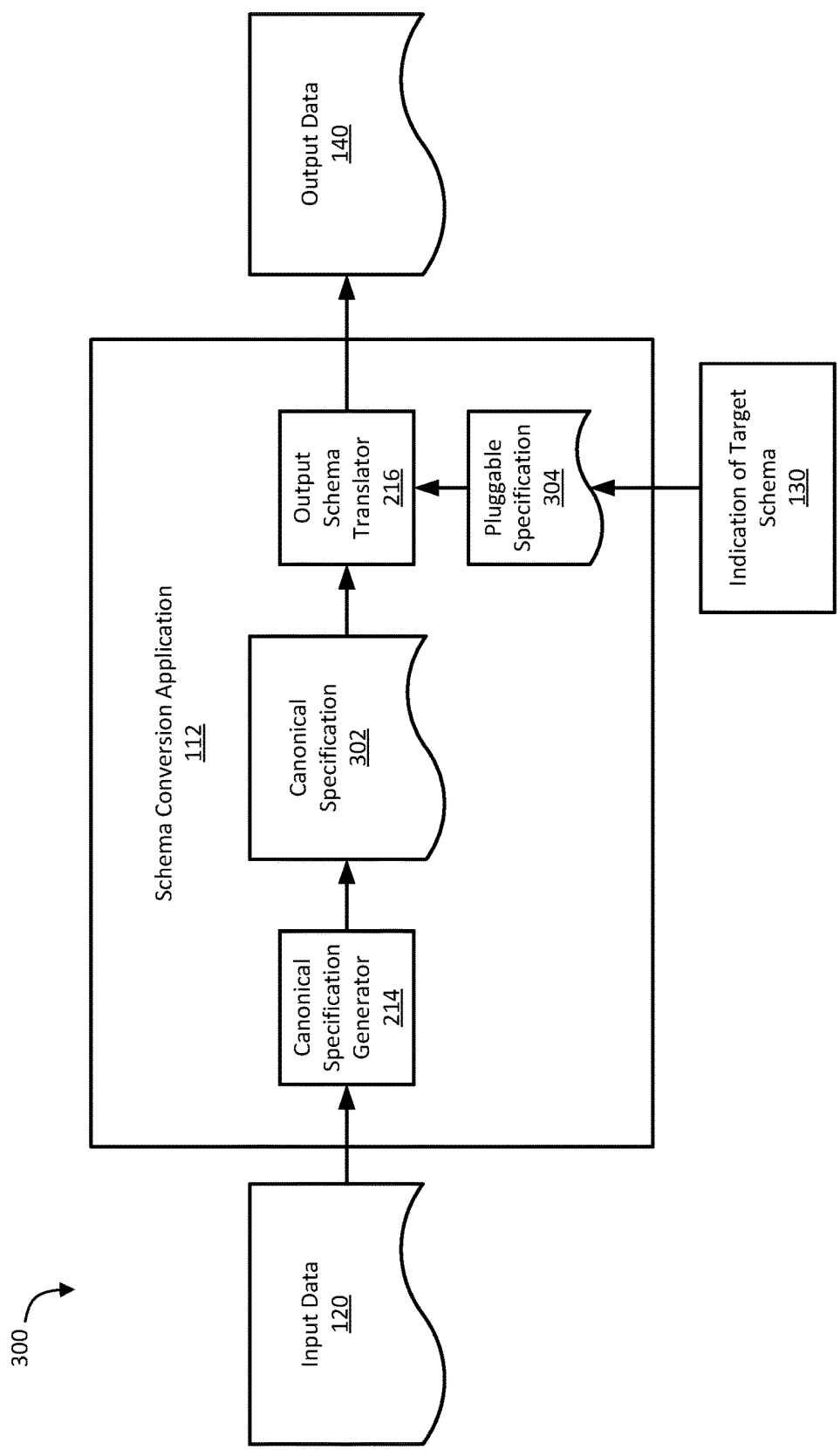
FIG. 3 is a schematic diagram of schema conversion components that are included in a schema conversion system, according to an embodiment.

FIG. 3 is a schematic diagram of schema conversion components 300, according to an embodiment. The schema conversion components 300 can be associated with a compute device (e.g., a compute device that is structurally and/or functionally similar to the compute device 110 of FIGS. 1 and 2). In some instances, for example, the schema conversion components 300 can be software stored in memory 210 and configured to execute via the processor 220 of FIG. 2. In some instances, for example, at least a portion of the schema conversion components 300 can be implemented in hardware. The schema conversion components 300 include the input data 120, the schema conversion application 112, the target schema indication 130, and the output data 140. The schema conversion application 112 include the canonical specification generator 214, a canonical specification 302, a pluggable specification 304, and the output schema translator 216.

As described herein, the canonical specification 302 can define and/or codify element(s) (e.g., principal aspects) of a virtual entity for a plurality of schemas, including a first schema associated with the input data 120 and a second schema associated with the output data 140. In some implementations, the canonical specification 302 can include an elemental metadata specification set that accumulates all or a portion of possible representations of an element type (e.g., an element type associated with datatypes, constraints, relationships, and/or indexing strategies) for a plurality of schemas. Said differently, the elemental metadata specification set can include a dictionary of element metadata that defines structures for specifying an element for a particular virtual entity according to a plurality of schemas. In some implementations, the elemental metadata specification can include a datatype specification set, a constraint specification set, a relationship specification set, a data security specification set, and/or a data security specification set.

The datatype specification set can define internal memory representations(s) of attribute(s) of a virtual model and/or a virtual entity and can include possible variations of datatypes across a plurality of schemas associated with a plurality of spatial representations. These variations can be associated with, for example, an allocation of bits, an allocation of signed and/or unsigned bits, a data format, and/or a floating-point bit representation for fraction components and/or exponent components. The following code block shows an example implementation of a datatype specification set that includes definitions for a plurality of datatype variations (e.g., int8, int16, int32, int64, char8, char16, and char32) associated with an attribute of a virtual entity.

```
id: datatype-registry
version: v1.0
description: complete registry of all datatype variations set:
    id: int8
    name: integer8bit
    size: 8
    unit: bit
    sign: 0
    id: int16
    name: integer16bit
    size: 16
    unit: bit
    sign: 0
    id: int32
    name: integer32bit
    size: 32
    unit: bit
    sign: 0
    id: int64
    name: integer32bit
    size: 64
    unit: bit
    sign: 0
    id: char8
    name: char8bit
    size: 8
    unit: bit
    sign: 0
    id: char16
    name: char16bit
    size: 16
    unit: bit
    sign: 0
    id: char32
    name: char32bit
    size: 32
    unit: bit
    sign: 0
```

The constraint specification set can include an accumulation of possible constraints for a plurality of spatial representations associated with a plurality of schemas. The constraints can be defined in the constraint specification set using a common syntactic and semantic system of notation. In some implementations, the constraints can be categorized as a value-based constraint and/or a relationship-based constraint. For example, the following code block shows definitions for a plurality of value-based constraint variations that can be associated with an entity based on a chosen schema to represent the entity.

```
id: constraint-registry
version: v1.0
description: complete registry of all constraint variations set:
    id: required
    name: required constraint
    applied-on: value
    alternatives:
        not null
    notation: length($value) > 0 | minimum($value) > 0
    id: not null
    name: not -null -constraint
    applied-on: value
    alternatives:
        required
    notation: length($value) > 0 | minimum($value) > 0
    id: pattern
    name: pattern constraint
    applied-on: value
    notation: regex($value)
    id: constant
    name: constant constraint
    applied-on: value
    notation: const($value)
    id: unique
    name: unique_constraint
    applied-on: value
    notation: SET($value)
    id: dependency
    name: dependency_constraint
    applied-on: value
    notation: DEP($value, $constraint)
```

The relationship specification set can aggregate possible linear and/or non-linear relationships among different virtual entities, depending on the schema associated with the spatial representation of the virtual entities. The relationships can include, for example, object-oriented relationship(s), graph relationship(s), network relationship(s), hierarchical relationship(s), and/or the like. In some implementations, two virtual entities can be related to one another through two or more relationships and/or types of relationships. The following code block shows definitions for a plurality of relationship variations (e.g., one-to-many relational relationships, one-to-one relational relationships, many-to-one relational relationships, and many-to-many relational relationships) associated with two or more virtual entities.

```
id: relationship-registry
version: v1.0
description: complete registry of all relationship variations
set:
    id: inheritance
    name: inheritance
    notation: $E super($P) context: object-oriented
    id: association
    name: association
    notation: $E associate($P) context: object-oriented alternatives:
    relational.one-to-many
    relational.many-to-one
    relational.one-to-one
    relational.many-to-many
    id: aggregation
    name: aggregation
    notation: $E aggr($P) context: object-oriented
    alternatives:
        relational.one-to-many
        relational.many-to-one
        relational.one-to-one
        relational.many-to-many
    id: composition
    name: composition
    notation: $E composite($P) context: object-oriented
    alternatives:
        relational.one-to-many
        relational.many-to-one
        relational.one-to-one
        relational.many-to-many
```

The data security specification set can define possible data obfuscation strategies for data associated with a virtual model and/or a virtual entity and for a plurality of schemas and/or spatial representations. The following code block shows example variations of a tokenization strategy (e.g., byte-pair encoding, word-piece tokenization, and unigram tokenization), an encryption strategy (e.g., encryption strategies based on the Advanced Encryption Standard (AES), the Data Encryption Standard (DES), the Rivest-Shamir-Adleman (RSA) algorithm, the Blowfish algorithm, and the Twofish algorithm), and a security strategy (e.g., a security strategy based on data masking).

```
id: relationship-registry
version: v1.0
description: complete registry of all data security variations
set:
    id: tokenization
    name: tokenization
    models:
        byte-pair-encoding
        word-piece
        unigram
    context: security
    id: encryption
    name: encryption
    algorithms:
        AES
        DES
        RSA
        Blowfish
        Twofist
    context: security
    id: masking
    name: masking
    context: security
```

The data indexing specification set can define possible indexing strategies that can be applied to attribute(s) of a virtual model and/or a virtual entity. These indexing strategies can be used for search optimization and can each be associated with a schema and/or spatial representation. The following code block shows an example of a data indexing specification set that defines primary, sparse, cluster, and secondary indexing strategies as possible indexing strategies associated with a virtual model and/or a virtual entity for at least one schema and/or spatial representation.

```
id: data-index-registry
version: v1.0
description: complete registry of all indexing strategy variations
set:
    id: primary
    name: primary
    context: relational notation: PK($attr)
    id: sparse
    name: sparse
    context: relational notation: SPARSE($attr)
    id: cluster
    name: cluster
    context: relational notation: CLUSTER($attr)
    id: secondary
    name: secondary context: relational notation: SK($attr)
```

The canonical specification 302 can further include an elemental specification that defines elements (i.e., foundational components, properties, and/or attributes) of a particular virtual model and/or a particular virtual entity. As described herein (e.g., in relation to FIG. 4), the elemental specification can define (1) a structure of a virtual model, a virtual entity, and/or attribute(s) of the virtual model and/or the virtual entity; (2) a datatype associated with attribute(s) of a virtual model and/or a virtual entity, (3) a constraint associated with a virtual model, a virtual entity, and/or attribute(s) of the virtual model and/or the virtual entity; (4) a relationship associated with a virtual model and/or two or more virtual entities; (5) immutable attributes associated with a virtual model and/or a virtual entity; (6) sensitive attribute(s) and one or more obfuscation strategies associated with those sensitive attribute(s); (7) a data indexing strategy associated with attributes; and/or (8) machine learning algorithm(s) and/or one or more feature matrices associated with a virtual model and/or a virtual entity and to be used for cognitive analysis (e.g., image recognition, voice recognition, natural language representation, and/or the like, performed on the virtual model and/or the virtual entity).

The following example code block shows a portion of an elemental specification for an entity "EMPLOYEE," which can be associated with, for example, an employee of an organization existing in the real world. The entity has a plurality of attributes, such as an identifier (EMPLOYEE_ID), a first name (FIRST_NAME), a last name (LAST_NAME), a salary (SALARY), a hire date (HIRE_DATE), a department they work for (DEPARTMENT), and a manager they work for (MANAGER). Each of these attributes is associated with a datatype (e.g., EMPLOYEE_ID has an int32 datatype, and FIRST_NAME has a string datatype), and at least some attributes are associated with a constraint (e.g., EMPLOYEE_ID is required and cannot by null, and LAST_NAME must be between 255 bits and 1024 bits in length).

```
data-type: object64
name: EMPLOYEE
version: draft-v1.0
attributes:
    EMPLOYEE_ID:
        data-type: int32
        constraints:
            not-null
            required
    FIRST_NAME:
        data-type: string
        constraints:
            not-null
            required
            max-length:
                value: 1024
            min-length:
                value: 255
    LAST_NAME:
        data-type: string
        constraints:
            not-null
            required
            max-length:
                value: 1024
            min-length:
                value: 255
    SALARY:
        data-type: float64.precision8
    HIRE_DATE:
        data-type: date.ISO8601-2:2019
    DEPARTMENT:
        data-type: object64
        "$loc": "#relations/employee-department"
    MANAGER:
        data-type: object64
        "$loc": "#relations/employee-employee"
```

The following example code block can be included in the elemental specification and shows relationships associated with the EMPLOYEE entity (e.g., a relationship between the employee and the employee's department, as defined by the employee ID (EMPLOYEE ID) and the department ID (DEPARTMENT_ID).

```
relations:
    employee-department:
        source: EMPLOYEE.EMPLOYEE_ID
        target: DEPARTMENT.DEPARTMENT_ID
        type:
            relational:one-to-one
            graph:s->t
    employee-employee:
        source: EMPLOYEE.EMPLOYEE_ID
        target: EMPLOYEE.EMPLOYEE_ID
        type:
            relational:one-to-one
            hierarchycal:this->t
```

The following example code block can be included in the elemental specification and shows an immutable property being associated with the EMPLOYEE_TD attribute, preventing that attribute from being modified. The example code block also shows the SALARY attribute being associated with a data security property, the elemental specification indicating that that attribute is to be encrypted according to the Advanced Encryption Standard (AES). The EMPLOYEE_TD is associated with a primary indexing strategy, and the indexing is associated with a user experience (UX) wireframe for visualization.

```
immutable:
    EMPLOYEE_ID
security:
    SALARY:
        id: encryption:AES
indexes:
    idx0:
        participants:
            EMPLOYEE_ID
        type:
            relational:primary
        cognitive:
            ux:
                wireframe:
                    path: "/opt/custom/spec"
                image:
                    spec:
                    features: "/opt/custom/features"
                    algorithm: "/opt/custom/data.pickle"
```

The pluggable specification 304 can be configured to define a mapping between element(s) of a virtual model and/or a virtual entity that are included in the elemental specification of the canonical specification 302 and associated element(s) included in one or more schemas associated with one or more spatial representations of the virtual model and/or the virtual entity. In some implementations, each of a plurality of pluggable specifications that includes the pluggable specification 304 can be configured to define (e.g., organize data associated with) a virtual model and/or virtual entity according to a desired spatial representation of that virtual model and/or virtual entity. In some implementations, the pluggable specification 304 can be selected from a plurality of pluggable specifications based on the target schema indication 130. In some implementations, the mapping defined by the pluggable specification 304 can be a bidirectional mapping. For example, although not shown in FIG. 3, the pluggable specification 304 can be configured to map element(s) defined according to a schema and included in input data 120 to associated element(s) defined by the canonical specification 302. The canonical specification generator 214 can use the pluggable specification 304 to generate the canonical specification 302 that includes representation(s) of the element(s) that are defined by the input data 120 and that are to be included in the output data 140.

The pluggable specification 304 can include one or more translation matrices configured to map element definitions between the canonical specification 302 and schemas associated with the input data 120 and/or the output data 140. In some implementations, the pluggable specification 304 can include a structural translation matrix, a datatype translation matrix, a constraint translation matrix, a relationship translation matrix, a data security translation matrix, and/or a data indexing translation matrix.

In some implementations, the structural translation matrix can provide syntactical and/or semantical mappings between a structural of the elemental specification included in the canonical specification 302 and a structure of the schema of a spatial representation. For example, a schema can be structured according to syntactic rule(s) and/or semantic rule(s) (e.g., rules associated with symbolic notation) for defining element(s) of a virtual entity. The structural translation matrix can take as input the elemental specification and generate at least a portion of a schema to be associated with the output data 140. The following example code block shows a structural translation matrix that can translate the structure of the canonical specification 302 to a schema associated with the Data Definition Language.

```
id: rnysql-ddl-translation
version: v1.0
translator: >-
    CREATE TABLE $entity
    (to_columns(entity.attributes))
data-types-translator: "./ddl/rnysql/datatypes.yrnl"
constraints-translator: "./ddl/rnysql/constraints.yrnl"
relationships-translator: "./ddl/rnysql/relationships.yrnl"
immutability-translator: "./ddl/rnysql/irnrnutability.yrnl"
security-translator: "./ddl/rnysql/security.yrnl"
```

The following example code block shows a structural translation matrix that can translate the structure of the canonical specification 302 to a structure of a JSON schema.

```
id: json-scherna-translation
version: v1.0
translator: >-
    {
        $schema: to_schema_id("draft07"),
        to_json_schema(entity.attributes)
    }
data-types-translator: "./ddl/json-scherna/datatypes.yrnl"
constraints-translator: "./ddl/json-scherna/constraints.yrnl"
relationships-translator: "./ddl/json-scherna/relationships.yrnl"
immutability-translator: "./ddl/json-scherna/irnrnutability.yrnl"
security-translator: "./ddl/json-scherna/security.yrnl"
```

In some implementations, the datatype translation matrix can be configured to convert datatypes associated with the canonical specification 302 and a schema associated with the target schema indication 130. The datatype translation matrix can take as input the elemental specification and the datatype specification set as input to generate at least a portion of a schema and/or at least a portion of the output data 140 structured according to the schema. The following example code block shows a datatype translation matrix that can translate elemental datatypes (e.g., datatypes associated with the canonical specification 302) and spatial datatypes (e.g., datatypes associated with a Data Definition Language schema).

```
id: mysql-ddl-data-type-translation
version: v1.0
resolver:
    elemental:
        type: int8
    spatial:
        type: INT
    elemental:
        type: int16
    spatial:
        type: INT
    elemental
        type: int32
    spatial:
        type: INT
    elemental:
        type: string
        length: 255
    spatial:
   type: VARCHAR
        length: 255
    elemental:
        type: float32
        length: 32
        precion: 8
    spatial:
        type: DECIMAL
        length: (32, 8)
```

The following example code block shows a datatype translation matrix that can translate elemental datatypes (e.g., datatypes associated with the canonical specification 302) and spatial datatypes (e.g., datatypes associated with a JSON schema schema).

```
id: jsonschema data type translation version: v1.0
resolver:
    elemental:
        type: int8
    spatial:
        type: integer
    elemental:
        type: int16
    spatial:
        type: integer
    elemental:
        type: int32
    spatial:
        type: integer
    elemental:
        type: string
        length: 255
    spatial:
        type: string
        length: 255
    elemental:
        type: float32
        length: 32
        precion: 8
    spatial:
        type: number
        length: 32
```

The constraint translation matrix can be configured to convert between (1) constraint(s) defined by the canonical specification 302 for a virtual model and/or virtual entity and (2) associated constraint(s) to be included in a spatial representation of that virtual model and/or virtual entity. The constraint translation matrix can take as input the constraints specification set and the elemental specification to generate at least a portion of a schema and/or at least a portion of the output data 140 structured according to the schema. The following example code block shows a constraint translation matrix that can translate elemental constraints (e.g., constraints associated with the canonical specification 302) and spatial constraints (e.g., constraints associated with a Data Definition Language schema).

```
id: mysql-ddl-constraints-translation
version: v1.0
translator: >-
    CREATE TABLE $entity
    (to constraints(entity.attributes.*.constraints))
resolver:
    elemental:
        type: required
    spatial:
        resolve: "NOT NULL"
    elemental:
        type: check
    spatial:
        resolve: >-
        "ALTER TABLE $entity
        ADD CONSTRAINT entity.[index].constraint.name
        CHECK (entity.[index].constraint.value)"
```

The following example code block shows a constraint translation matrix that can translate elemental constraints (e.g., constraints associated with the canonical specification 302) and spatial constraints (e.g., constraints associated with a JSON schema).

```
id: jsonschema-constraints-translation version: v1.0
resolver:
    elemental:
        type: required
    spatial:
        resolve: "required [ $entity.attributes[index] ]"
    elemental:
        type: check
    spatial:
        resolve:
            schema:
                salary:
                    minimum: 10000.00
```

The relationship translation matrix can be configured to convert between (1) a relationship(s) defined by the canonical specification 302 for a virtual model and/or virtual entity and (2) an associated relationship(s) to be included in a spatial representation of that virtual model and/or virtual entity. The relationship translation matrix can take as input the relationship specification set and the elemental specification to generate at least a portion of a schema and/or at least a portion of the output data 140 structured according to the schema. The following example code block shows a relationship translation matrix that can translate elemental relationships (e.g., relationships associated with the canonical specification 302) and spatial relationships (e.g., relationships associated with a Data Definition Language schema).

```
id: mysql-ddl-constraints-translation
version: v1.0
translator: >-
    CREATE TABLE $entity
    (to_relationships(entity.relationships))
resolver:
    elemental:
        type: relational.one-to-many
    spatial:
        resolve: "FOREIGN KEY ${name} ($entity.attribute.name)
        ON
           ($entity.attribute.dependent.name) "
```

The following example code block shows a relationship translation matrix that can translate elemental relationships (e.g., relationships associated with the canonical specification 302) and spatial relationships (e.g., relationships associated with a JSON schema).

```
id: jsonschema-relationship-translation
version: v1.0
resolver:
    elemental:
        type: relational.one-to-many
    spatial:
        resolve:
            schema:
                type: array
                items:
                    "$ref": "!#definitions/${entity}"
```

The data security translation matrix can be configured to convert between (1) a data security standard defined by the canonical specification 302 for a virtual model and/or virtual entity and (2) a data security standard to be associated with a spatial representation of that virtual model and/or virtual entity. The data security translation matrix can take as input the data security specification set and the elemental specification to generate at least a portion of a schema and/or at least a portion of the output data 140 structured according to the schema.

The data indexing translation matrix can be configured to convert between (1) a data index defined by the canonical specification 302 for a virtual model and/or virtual entity and (2) a data index to be associated with a spatial representation of that virtual model and/or virtual entity. The data indexing translation matrix can take as input the data indexing specification set and the elemental specification to generate at least a portion of a schema and/or at least a portion of the output data 140 structured according to the schema. The following example code block shows a data indexing translation matrix that can translate an elemental indexing strategy (e.g., an indexing method associated with the canonical specification 302) and a spatial indexing strategy (e.g., an indexing method associated with a Data Definition Language schema).

```
id: roysql-ddl-index-translation
version: v1.0
translator: >-
    CREATE INDEX $index
    (to_index(entity.indexes[idx]))
resolver:
    elemental:
        type: relational.primary
    spatial:
        resolve: "$PK($attr)"
```

Figure 4:
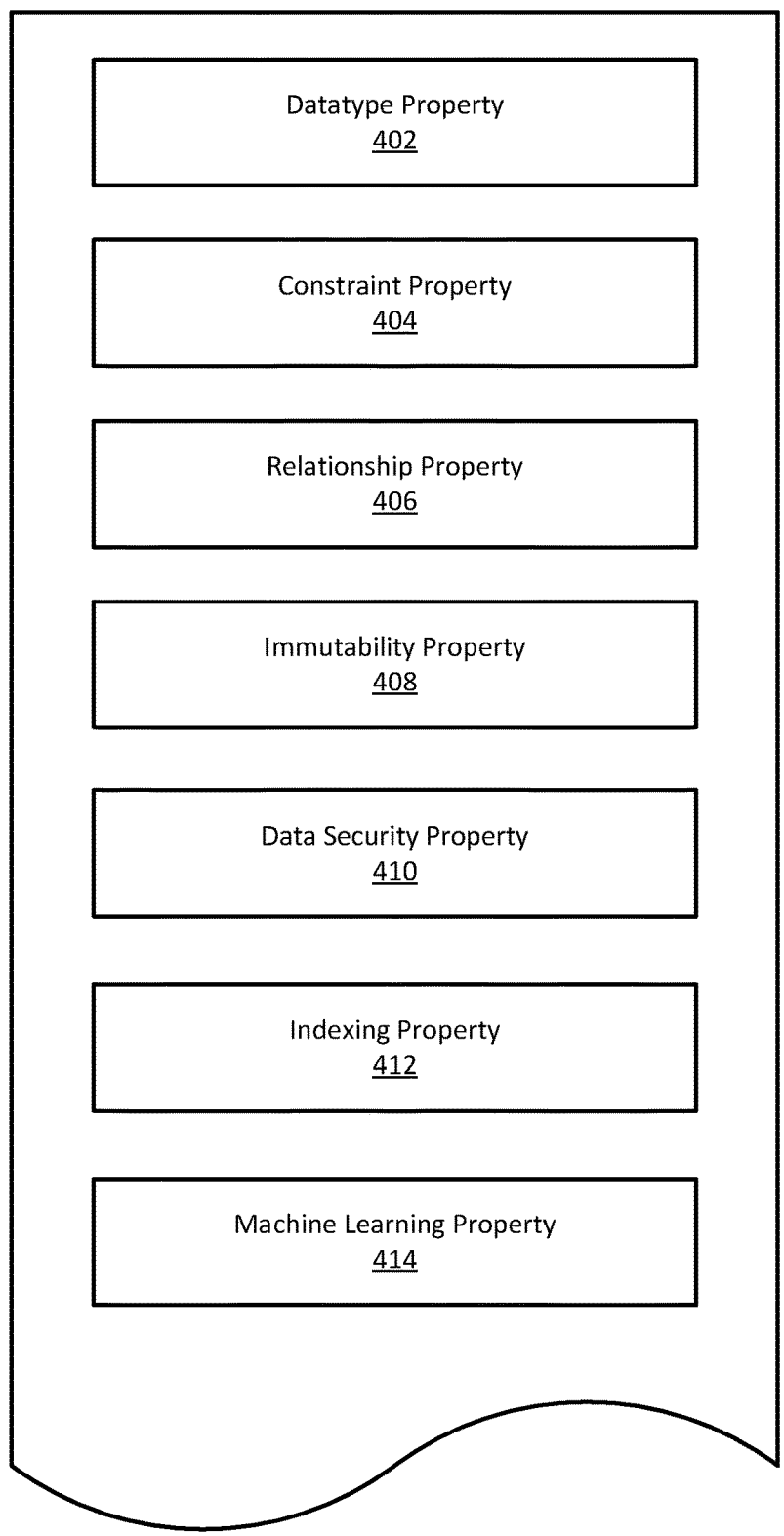
FIG. 4 is a schematic diagram of a user requirements specification that is associated with a schema conversion system, according to an embodiment.

FIG. 4 is a schematic diagram of the canonical specification 302 from the schema conversion components 300 shown in FIG. 3, according to an embodiment. As described herein, the canonical specification 302 can include an elemental specification that defines at least one property of a virtual model and/or a virtual entity. The at least one property can include the elemental specification defining at least one of (1) a datatype property 402, (2) a constraint property 404, (3) a relationship property 406, (4) an immutability property 408, (5) a data security property 410, (6) an indexing property 412, and/or (7) a machine learning property 414.

The datatype property 402 can be associated with a datatype element and can define an in-memory representation of at least a portion (e.g., an attribute, such as value associated with age, price, weight, and/or the like) of a virtual model, virtual entity, and/or the like for at least one spatial representation. For example, the datatype property 402 can specify a desired byte allocation strategy, a desired value range, and/or a desired value format (e.g., an integer, string, character, Boolean, and/or the like), for attribute(s) included in the virtual model and/or the virtual entity. In some implementations, these attribute(s) can be associated with a primitive datatype and/or a complex datatype. As described herein, the data property 402 can be provided as input to a datatype translation matrix to generate output data (e.g., the output data 140 of FIG. 1) that is structured according to a target schema (e.g., as indicated by the target schema indication 130) and that has a datatype that is different from the datatype property 402 and that is associated with the same attribute as the datatype property 402. In some instances, the datatype property 402 can be included in a plurality of datatype properties and can be further included in an elemental specification of the canonical specification 302 of FIG. 3.

The constraint property 404 can be associated with a constraint element and can define a limitation and/or rule to be enforced against a virtual model, virtual entity, and/or the like. In some implementations, the constraint property 404 can include a datatype validation constraint, a NOT NULL constraint, a CHECK constraint, and/or the like. In some implementations, the constraint property 404 can define a key constraint that includes, for example, a unique key, a candidate key, and/or the like. In some implementations, the constraint property 404 can define an entity integrity constraint (i.e., a primary key constraint) that is configured to maintain the integrity of the virtual model, virtual entity, and/or the like. In some implementations, the constraint property 404 can define a referential integrity constraint. A referential integrity constraint can include, for example, a foreign key constraint that is configured to maintain the referential integrity of the virtual model, virtual entity, and/or the like. In some implementations, the constraint property 404 can include a semantic constraint that enforces data to be structured according to a desired datatype. As described herein, the constraint property 404 can be provided as input to a constraint translation matrix to generate output data (e.g., the output data 140 of FIG. 1). This output data can be structured according to a target schema (e.g., as indicated by the target schema indication 130) and can include a constraint that is associated with the constraint property 404 and that is defined according to a format that is different from the format of the constraint property 404. In some instances, the constraint property 404 can be included in a plurality of constraint properties and can be further included in an elemental specification of the canonical specification 302 of FIG. 3.

The relationship property 406 can be associated with a relationship element and can define relationships between aspect(s) of a virtual model, virtual entity, and/or the like, and/or can define relationships between a plurality of virtual entities. In some implementations, a relationship property 406 can be associated with an object-oriented interpretation of data, a relational database-centric interpretation of data, a graph database, a hierarchical database, a network database, and/or the like, as discussed herein (e.g., in relation to FIG. 1). As described herein, the relationship property 406 can be provided as input to a relationship translation matrix to generate output data (e.g., the output data 140 of FIG. 1).

This output data can be structured according to a target schema (e.g., as indicated by the target schema indication 130) and can include a relationship that is associated with the relationship property 406 and that is structured according to a format that is different from the format of the relationship property 406. In some instances, the relationship property 406 can be included in a plurality of relationship properties and can be further included in an elemental specification of the canonical specification 302 of FIG. 3.

The immutability property 408 can be associated with an immutability element and can define immutability characteristic(s) of a virtual model, a virtual entity, and/or the like. The virtual model and/or virtual entity can include one or more attributes that cannot be changed, cannot be changed nonmonotonically, and/or cannot increase and/or decrease, as defined by the immutability property 408. For example, an entity the represents an employee can have an identification attribute that is associated with an immutability property 408 that prevents modification to the identification attribute. The entity can further have, for example, a years-of-service attribute that is associated with an additional immutability property that prevents any modifications to that attribute other than monotonically increasing modifications to a value associated with that attribute. The entity can further have, for example, a vacation-time attribute that can have a pre-defined rate of increase and permit no other changes other than a decrease in value. In some implementations, an entity can include an immutable attribute that remains unchanged throughout the lifecycle of the entity. An entity can also include a mutable attribute that can change during the lifecycle of the entity and that is not associated with an immutability property 408. The immutability property 408 be included in a plurality of immutability properties and can be further included in an elemental specification of the canonical specification 302 of FIG. 3. The schema conversion system 100 of FIG. 1 can be configured to enforce the immutability property 408 in an associated attribute included in a spatial representation that is formatted according to a target schema.

The data security property 410 can be associated with an obfuscation element and can be configured to obfuscate sensitive and/or security-related attribute(s) and/or data included in a virtual model and/or virtual entity. The data security property 410 can cause an attribute and/or data to be obfuscated through masking (e.g., replacing and/or switching part of the data), encryption (e.g., using a cryptographic algorithm to encrypt the data), tokenization (e.g., replacing certain parts of the data with random and/or meaningless values), and/or the like. As described herein, the data security property 410 can be provided as input to a data security translation matrix to generate output data (e.g., the output data 140 of FIG. 1). This output data can be structured according to a target schema (e.g., as indicated by the target schema indication 130) and can include a data security provision that is associated with the data security property 410 and that is structured according to a format and/or implemented via an algorithm and/or method that is different from the format and/or algorithm and/or method defined by the data security property 410. In some instances, the data security property 410 can be included in a plurality of data security properties and can be further included in an elemental specification of the canonical specification 302 of FIG. 3.

The indexing property 412 can be associated with an indexing element and can be configured to cause an attribute included in a virtual model and/or virtual entity to be searchable via a search operation. As described herein, the indexing property 412 can be provided as input to a data security translation matrix to generate output data (e.g., the output data 140 of FIG. 1). This output data can be structured according to a target schema (e.g., as indicated by the target schema indication 130) and can include an indexing provision that is associated with the indexing property 412 and that is structured according to a format and/or implemented via an algorithm and/or method that is different from the format and/or algorithm and/or method defined by the indexing property 412. In some instances, the indexing property 412 can be included in a plurality of indexing properties and can be further included in an elemental specification of the canonical specification 302 of FIG. 3.

The machine learning property 414 can be associated with a cognitive facet element and can be configured to define feature(s) of a virtual model, virtual entity, and/or the like that are associated with cognitive aspect(s). For example, these cognitive aspect(s) can include machine learning algorithm type(s) (e.g., neural networks, support vector machines, classifiers, random forest algorithms, and/or the like), training and/or validation datasets, and/or the like. In some implementations, the machine learning property 414 can define a feature matrix associated with the entity. A feature matrix can be, for example, a two-dimensional table. A first dimension of this table can be a concatenation of features (e.g., attributes) associated with the entity, and a second dimension of this table can be samples (i.e., observations) of those features. Said differently, the feature matrix can include a column of samples for each feature included in the feature matrix. The feature matrix can include training, validation, and/or inference data used by a machine learning algorithm to predict a target feature from the feature matrix based on remaining features in the feature matrix. The indicated machine learning algorithm type(s), feature matrix, and/or training datasets can be used to perform a machine-learning-based operation on the virtual model and/or virtual entity, such as image recognition, natural language processing, voice recognition, and/or the like. In some instances, the machine learning property 414 can be included in a plurality of machine learning properties and can be further included in an elemental specification of the canonical specification 302 of FIG. 3. The schema conversion system 100 of FIG. 1 can be configured to include a representation of the machine learning property 414 in a target schema and/or the output data (e.g., the output data 140).

Figure 5:
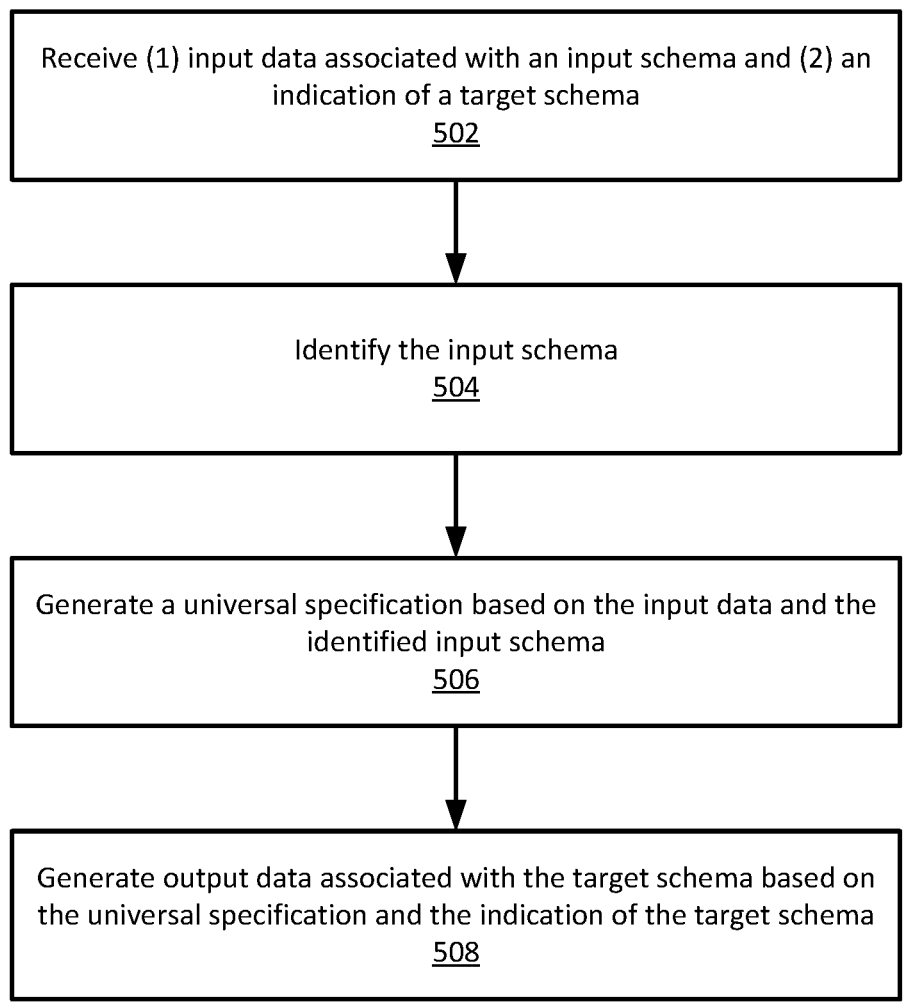
FIG. 5 is a flowchart showing a method of using a schema conversion system to generate a representation of an entity, according to an embodiment.

FIG. 5 is a flowchart showing a method 500 illustrating an example implementation using a schema conversion system, according to an embodiment. The method 500 can be implemented by a schema conversion system described herein (e.g., the schema conversion system 100 of FIG. 1). Portions of the method 500 can be implemented using a processor (e.g., the processor 220 of FIG. 2) of any suitable compute device (e.g., the compute device 110 of FIG. 1). The method 500 can include a method of generating output data that is associated with a target schema.

The method 500 at 502 includes receiving (1) input data (e.g., the input data 120 of FIG. 1) associated with an input schema and (2) an indication of a target schema (e.g., the target schema indication 130 of FIG. 1). In some instances, the receiving can include receiving from a user via a user interface (e.g., the user interface 212 of FIG. 2). The user interface can include, for example, a RESTful interface, a command line interface, a programmable interface, a graphical user interface (GUI), and/or the like, as described herein. The input data can be formatted according to an input schema and can include a representation of a digital model, a digital entity, and/or a similar collection of related information.

The method 500 at 504 includes identifying the input schema. In some instances, the identifying can be based on an indication provided by the user (e.g., via the user interface 212 of FIG. 2, a RESTful interface, a command line interface, a programmable interface, a graphical user interface (GUI), and/or the like, as described herein). In some instances, the identifying can be performed automatically (i.e., without human intervention) by a parser, a lexical analyzer, a transformer model, and/or the like. In some instances, the identifying can be based on sequence(s) of character(s) that are unique to or indicative of the target schema.

The method 500 at 506 includes generating a universal specification (e.g., the canonical specification 302 of FIG. 3) based on the input data and the input schema identified at 504. In some instances, the canonical specification generator 214 of FIG. 2 can be used to generate the universal specification automatically (i.e., without human intervention), as described herein. In some implementations, the universal specification can be generated using one or more translation matrices that can bi-directionally map elements between a schema (e.g., the input schema) and the universal specification, as described herein in relation to, for example, FIG. 3. In some implementations, the universal specification can define a plurality of variations of an element and/or an attribute of a virtual model and/or a virtual entity, each variation being associated with a different schema. In some implementations, the universal specification can be universally (as to a plurality of schemas) standardized to facilitate lossless and/or substantially lossless interoperability among at least some schemas from the plurality of schemas.

The method 500 at 508 includes generating output data (e.g., the output data 140 of FIG. 1) associated with the target schema based on the universal specification and the indication of the target schema. In some instances, the output schema translator of FIG. 2 can be used to generate the output data automatically (i.e., without human intervention), based on a pluggable specification (e.g., the pluggable specification 304 of FIG. 3), as described herein. In some instances, the pluggable specification can be selected from a plurality of pluggable specifications based on the target schema indication received at 502. The output data 140 can be generated using one or more translation matrices that can bi-directionally map elements between a schema (e.g., a schema associated with the target schema indication received at 502) and the universal specification, as described herein in relation to, for example, FIG. 3.

Figure 6:
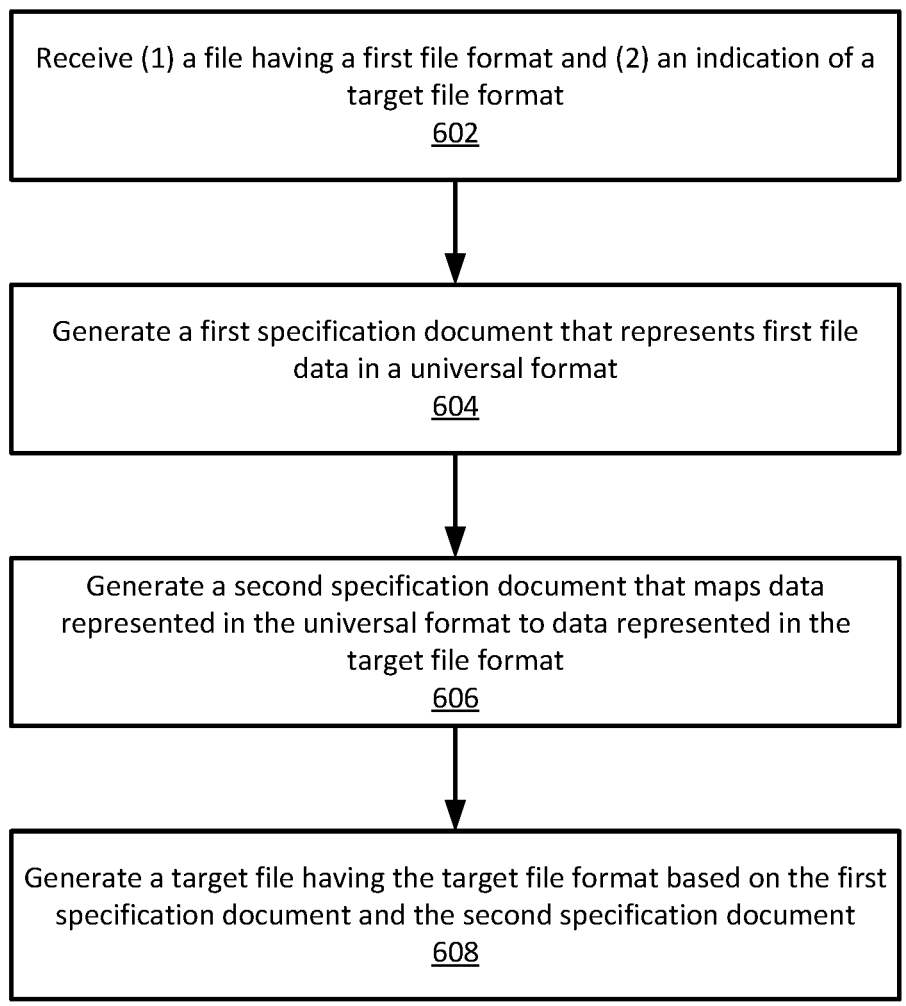
FIG. 6 is a flowchart showing a method of using a schema conversion system to generate a file that encodes data, according to an embodiment.

FIG. 6 is a flowchart showing a method 600 illustrating an example implementation using a schema conversion system, according to an embodiment. The method 600 can be implemented by a schema conversion system described herein (e.g., the schema conversion system 100 of FIG. 1). Portions of the method 600 can be implemented using a processor (e.g., the processor 220 of FIG. 2) of any suitable compute device (e.g., the compute device 110 of FIG. 1). The method 600 can include a method of generating a target file that is formatted according to a target file format.

The method 600 at 602 includes receiving (1) a file (that includes, for example, the input data 120 of FIG. 1) having a first file format and (2) an indication of a target file format (e.g., the target schema indication 130 of FIG. 1). In some implementations, the file and/or the indication can be received via a user interface (e.g., the user interface 212 of FIG. 2, a RESTful interface, a command line interface, a programmable interface, a graphical user interface (GUI), and/or the like). The file can be formatted according to an input schema and can include data that represents a digital model, a digital entity, and/or a similar collection of related information. In some implementations, the input schema can be different from a schema associated with the indication of a target file format.

The method 600 at 604 includes generating a first specification document (e.g., the canonical specification 302 of FIG. 3) that represents first file data in a universal format. In some implementations, the first specification document can be generated using one or more translation matrices that can bi-directionally map elements between a schema (e.g., the input schema) and the first specification document, as described herein in relation to, for example, FIG. 3. In some implementations, the first specification document can define a plurality of variations of an element and/or an attribute of a virtual model and/or a virtual entity, each variation being associated with a different schema. In some implementations, the first specification document can be globally (as to a plurality of schemas) standardized to facilitate lossless and/or substantially lossless interoperability among at least some schemas from the plurality of schemas. In some implementations, the generating can be performed automatically (i.e., without human intervention) using, for example, the canonical specification generator 214 of FIG. 2.

The method 600 at 606 includes generating a second specification document that maps data represented in the universal format to data represented in the target file format. In some instances, the generating can be performed by a specification generator (e.g., the canonical specification generator 214 of FIG. 2) automatically (i.e., without human intervention), as described herein. The generating can include, for example, compiling one or more translation matrices associated with the target file format, as described herein. In some implementations, the second specification document can include the pluggable specification 304 of FIG. 3.

The method 600 at 608 includes generating a target file (e.g., a file containing the output data 140 of FIG. 1) having the target file format based on the first specification document and the second specification document. The target file format can be a schema associated with the indication of a target file format received at 602. In some instances, the generating can be performed by a file generator (e.g., the output schema translator 216 of FIG. 2) automatically (i.e., without human intervention), as described herein. The target file can include a representation of the digital model, the digital entity, and/or the collection of related information. In some implementations, the representation can be a spatial representation that is different than a spatial representation of the digital model, the digital entity, and/or the collection of related information, that is included in the file received at 602.

FIG. 7 is a flowchart showing a method 700 illustrating an example implementation using a schema conversion system, according to an embodiment. The method 700 can be implemented by a schema conversion system described herein (e.g., the schema conversion system 100 of FIG. 1). Portions of the method 700 can be implemented using a processor (e.g., the processor 220 of FIG. 2) of any suitable compute device (e.g., the compute device 110 of FIG. 1). The method 700 can include a method of outputting a target format-compliant file.

The method 700 at 702 includes receiving a request from a user to convert data from an initial format to a target format. The initial format can be associated with a first schema, and the target format can be associated with a second schema that is different from the first schema. The request can include, for example, data (e.g., the input data 120 of FIG. 1) and an indication of the target format (e.g., the target schema indication 130 of FIG. 1). In some implementations, the request can be received via a user interface (e.g., the user interface 212 of FIG. 2, a RESTful interface, a command line interface, a programmable interface, a graphical user interface (GUI), and/or the like). The data can include data that represents a digital model, a digital entity, and/or a similar collection of related information.

The method 700 at 704 includes referencing specification document(s) to identify portion(s) of the data to include in a target file (e.g., a file containing the output data 140 of FIG. 1) that complies with the target format. For example, such identified portion(s) of the data can be structured have 100% compliance with the target format. Any portion(s) of the data that have less than 100% compliance with the target format can be excluded from the target format, as discussed in relation to 706. The specification document(s) can include, for example, at least one of the canonical specification 302 of FIG. 2, the prototype specification 304, an elemental metadata specification, an elemental specification, and/or the like, as described herein. In some implementations, the portion(s) of the data can include data associated with a property and/or attribute that has a definition according to the initial format that is equivalent to the definition stipulated by the target format. The referencing can be performed automatically (i.e., without human intervention) via, for example, the schema conversion application 112 of FIG. 1, as described herein.

The method 700 at 706 includes referencing the specification document(s) to identify additional data to include in the target file. The additional data can include, for example, data associated with a property and/or attribute that has a definition stipulated by the initial format that is different from a definition stipulated by the target format. Said differently, the additional data can replace any portion(s) of the data that have less than 100% compliance with the target format. In some instances, the additional data can augment the portion(s) of the data included at 704. For example, the initial format can be a first schema that defines a first structure for representing an attribute and/or property of a virtual entity and/or virtual model, and the target format can be second schema that defines a second structure for representing the attribute and/or property of the virtual entity and/or virtual model, where the first structure is different from the second structure. The referencing can be performed automatically (i.e., without human intervention) via, for example, the schema conversion application 112 of FIG. 1, as described herein.

The method 700 at 708 includes outputting the target format-compliant target file. The modifying can be performed automatically (i.e., without human intervention) via, for example, the schema conversion application 112 of FIG. 1, as described herein.

In an embodiment, a method includes receiving, at one or more processors, (1) first data that is structured according to a first schema and that includes a first representation of an entity and (2) an indication of a target schema. The method also includes generating, using the one or more processors, an elemental specification associated with the first data, the elemental specification defining at least one of (1) a datatype property, (2) a constraint property, (3) a relationship property, (4) an immutability property, (5) a data security property, (6) an indexing property, or (7) a feature matrix and an indication of a neural network to use the feature matrix. The method also includes generating, using the one or more processors and based on (1) the elemental specification and (2) a translation specification associated with the target schema, second data structured according to the target schema, the second data including a second representation of the entity that is equivalent to the first representation of the entity.

In some implementations, the immutability property can include at least one of (1) a first constraint that excludes a modification to at least a portion of the first data, (2) a second constraint that excludes a nonmonotonic modification to at least a portion of the first data, (3) a third constraint that excludes one of an increase or a decrease to at least a portion of the first data, or (4) a fourth constraint that excludes a deletion to at least a portion of the first data.

In some implementations, the relationship property can define at least one of an object-oriented relationship associated with the entity, a relational relationship associated with the entity, a graph relationship associated with the entity, a network relationship associated with the entity, or a hierarchical relationship associated with the entity.

In some implementations, the translation specification can define a plurality of mappings between the elemental specification and the target schema, and the translation specification can include at least one of (1) a structural translation matrix defining one or more mappings from the plurality of mappings, (2) a datatype translation matrix defining one or more mappings from the plurality of mappings, (3) a constraint translation matrix defining one or more mappings from the plurality of mappings, (4) a relationship translation matrix defining one or more mappings from the plurality of mappings, (5) a data security translation matrix defining one or more mappings from the plurality of mappings, or (6) a data indexing translation matrix defining one or more mappings from the plurality of mappings.

In some implementations, the first schema can be a conceptual data model.

In some implementations, the generating the second data can be performed using an executable program configured to query the elemental specification and the translation specification.

In some implementations, the target schema can be associated with a file format configured for data exchange.

In an embodiment, a non-transitory processor-readable medium stores code representing instructions to be executed by one or more processors, the instructions including code to cause the one or more processors to receive (1) a first file that encodes first data according to a first file format, the first data including a virtual entity, and (2) an indication of a target file format. The instructions also include code to cause the one or more processors to generate a first specification document associated with the first data, the first specification document defining at least one of (1) a datatype property, (2) a constraint property, (3) a relationship property, (4) an immutable property, (5) a data security property, (6) an indexing property, or (7) a machine learning property. The instructions also include code to cause the one or more processors to generate, based on the first specification document and a second specification document associated with the target file format, a second file that encodes second data according to the target file format, the second data including the virtual entity.

In some implementations, the datatype property can include at least one of a bit allocation property, a signed number property, a data format property, or a floating-point number property.

In some implementations, the relationship property can define at least one of an object-oriented relationship associated with the virtual entity, a relational relationship associated with the virtual entity, a graph relationship associated with the virtual entity, a network relationship associated with the virtual entity, or a hierarchical relationship associated with the virtual entity.

In some implementations, the second specification document associated with the target file format can define a plurality of mappings between the first specification document and the target file format, the second specification including at least one of a structural translation matrix, a datatype translation matrix, a constraint translation matrix, a relationship translation matrix, a data security translation matrix, or a data indexing translation matrix.

In some implementations, the first file can include a conceptual data model.

In some implementations, the generating the second file can be performed using an executable program configured to query the first specification document and the second specification document.

In some implementations, the target file format can be configured for data exchange.

In an embodiment, a non-transitory processor-readable medium stores code representing instructions to be executed by one or more processors, the instructions including code to cause the one or more processors to (1) receive a query that includes an indication of data and an indication of a target file standard and (2) retrieve, from memory, an input file that includes the data and that is formatted according to an input file standard. The instructions also include code to cause the one or more processors to select a portion of the data, the portion of the data being less than an entirety of the data, based, at least in part, on one or more specification documents that indicate that the portion of the data complies with the target file standard. The instructions also include code to cause the one or more processors to generate, based on the one or more specification documents, supplemental data that is excluded from the data and that is to be included in a target file that complies with the target file standard. The instructions also include code to cause the one or more processors to generate the target file that complies with the target file standard and that includes the portion of the data and the supplemental data.

In some implementations, the supplemental data can include metadata that is associated with (1) the target file standard and (2) a plurality of properties of the portion of the data, and the portion of the data can be associated with a virtual entity.

In some implementations, the non-transitory processor-readable medium can further store instructions to cause the one or more processors to receive a second query that includes the indication of the data and a second indication of a second target file standard. The instructions can also include code to cause the one or more processors to select the portion of the data based, at least in part, on the one or more specification documents that indicate that the portion of the data complies with the second target file standard. The instructions can also include code to cause the one or more processors to generate, based on the one or more specification documents, second supplemental data that is excluded from the data and that is to be included in a second target file that complies with the second target file standard. The instructions can also include code to cause the one or more processors to generate the second target file that complies with the second target file standard and that includes the portion of the data and the second supplemental data.

In some implementations, the one or more specification documents can include (1) a universal specification, (2) a first translation specification that defines a first plurality of mappings between first metadata associated with the universal specification and second metadata associated with the input file standard, and (3) a second translation specification that defines a second plurality of mappings between the first metadata associated with the universal specification and third metadata associated with the target file standard.

In some implementations, the code to receive can include code to receive an Application Programming Interface (API) call that includes the query.

In some implementations, the target file standard can be configured for data exchange.

All combinations of the foregoing concepts and additional concepts discussed here (provided such concepts are not mutually inconsistent) are contemplated as being part of the subject matter disclosed herein. The terminology explicitly employed herein that also may appear in any disclosure incorporated by reference should be accorded a meaning most consistent with the particular concepts disclosed herein.

The skilled artisan will understand that the drawings primarily are for illustrative purposes, and are not intended to limit the scope of the subject matter described herein. The drawings are not necessarily to scale; in some instances, various aspects of the subject matter disclosed herein may be shown exaggerated or enlarged in the drawings to facilitate an understanding of different features. In the drawings, like reference characters generally refer to like features (e.g., functionally similar and/or structurally similar elements).

To address various issues and advance the art, the entirety of this application (including the Cover Page, Title, Headings, Background, Summary, Brief Description of the Drawings, Detailed Description, Embodiments, Abstract, Figures, Appendices, and otherwise) shows, by way of illustration, various embodiments in which the embodiments may be practiced. The advantages and features of the application are of a representative sample of embodiments only, and are not exhaustive and/or exclusive. Rather, they are presented to assist in understanding and teach the embodiments, and are not representative of all embodiments. As such, certain aspects of the disclosure have not been discussed herein. That alternate embodiments may not have been presented for a specific portion of the innovations or that further undescribed alternate embodiments may be available for a portion is not to be considered to exclude such alternate embodiments from the scope of the disclosure. It will be appreciated that many of those undescribed embodiments incorporate the same principles of the innovations and others are equivalent. Thus, it is to be understood that other embodiments may be utilized and functional, logical, operational, organizational, structural and/or topological modifications may be made without departing from the scope and/or spirit of the disclosure. As such, all examples and/or embodiments are deemed to be non-limiting throughout this disclosure.

Also, no inference should be drawn regarding those embodiments discussed herein relative to those not discussed herein other than it is as such for purposes of reducing space and repetition. For instance, it is to be understood that the logical and/or topological structure of any combination of any program components (a component collection), other components and/or any present feature sets as described in the figures and/or throughout are not limited to a fixed operating order and/or arrangement, but rather, any disclosed order is exemplary and all equivalents, regardless of order, are contemplated by the disclosure.

Various concepts may be embodied as one or more methods, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments. Put differently, it is to be understood that such features may not necessarily be limited to a particular order of execution, but rather, any number of threads, processes, services, servers, and/or the like that may execute serially, asynchronously, concurrently, in parallel, simultaneously, synchronously, and/or the like in a manner consistent with the disclosure. As such, some of these features may be mutually contradictory, in that they cannot be simultaneously present in a single embodiment. Similarly, some features are applicable to one aspect of the innovations, and inapplicable to others.

In addition, the disclosure may include other innovations not presently described. Applicant reserves all rights in such innovations, including the right to embodiment such innovations, file additional applications, continuations, continuations-in-part, divisionals, and/or the like thereof. As such, it should be understood that advantages, embodiments, examples, functional, features, logical, operational, organizational, structural, topological, and/or other aspects of the disclosure are not to be considered limitations on the disclosure as defined by the embodiments or limitations on equivalents to the embodiments. Depending on the particular desires and/or characteristics of an individual and/or enterprise user, database configuration and/or relational model, data type, data transmission and/or network framework, syntax structure, and/or the like, various embodiments of the technology disclosed herein may be implemented in a manner that enables a great deal of flexibility and customization as described herein.

All definitions, as defined and used herein, should be understood to control over dictionary definitions, definitions in documents incorporated by reference, and/or ordinary meanings of the defined terms.

As used herein, in particular embodiments and unless stated otherwise, the terms "about" "substantially" or "approximately" when preceding a numerical value indicates the value plus or minus a range of 10%. Where a range of values is provided, it is understood that each intervening value, to the tenth of the unit of the lower limit unless the context clearly dictates otherwise, between the upper and lower limit of that range and any other stated or intervening value in that stated range is encompassed within the disclosure. That the upper and lower limits of these smaller ranges can independently be included in the smaller ranges is also encompassed within the disclosure, subject to any specifically excluded limit in the stated range. Where the stated range includes one or both of the limits, ranges excluding either or both of those included limits are also included in the disclosure.

The indefinite articles "a" and "an," as used herein in the specification and in the embodiments, unless clearly indicated to the contrary, should be understood to mean "at least one."

The phrase "and/or," as used herein in the specification and in the embodiments, should be understood to mean "either or both" of the elements so conjoined, i.e., elements that are conjunctively present in some cases and disjunctively present in other cases. Multiple elements listed with "and/of" should be construed in the same fashion, i.e., "one or more" of the elements so conjoined. Other elements may optionally be present other than the elements specifically identified by the "and/of" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the embodiments, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the embodiments, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the embodiments, shall have its ordinary meaning as used in the field of patent law.

As used herein in the specification and in the embodiments, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the embodiments, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

Some embodiments and/or methods described herein can be performed by software (executed on hardware), hardware, or a combination thereof. Hardware modules may include, for example, a processor, a field programmable gate array (FPGA), and/or an application specific integrated circuit (ASIC). Software modules (executed on hardware) can include instructions stored in a memory that is operably coupled to a processor, and can be expressed in a variety of software languages (e.g., computer code), including C, C++, Java™, Ruby, Visual Basic™ and/or other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

The term "processor" should be interpreted broadly to encompass a general purpose processor, a central processing unit (CPU), a microprocessor, a digital signal processor (DSP), a controller, a microcontroller, a state machine and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may comprise a single computer-readable statement or many computer-readable statements.

While specific embodiments of the present disclosure have been outlined above, many alternatives, modifications, and variations will be apparent to those skilled in the art. Accordingly, the embodiments set forth herein are intended to be illustrative, not limiting. Various changes may be made without departing from the spirit and scope of the disclosure.

The invention claimed is:

1. A method, comprising:
    receiving, at one or more processors, first data that is structured according to a first schema and that includes an in-transit representation of an entity in transit between an event producer and an event consumer, the in-transit representation being associated with a data exchange;
    receiving, at the one or more processors, an indication of a target schema associated with an image representation of the entity;
    generating, using the one or more processors, an elemental specification associated with the first data, the elemental specification defining (1) a feature matrix having (a) a plurality of features of the entity and (b) a plurality of observations for each feature from the plurality of features and (2) a machine learning model type selected from at least one of a neural network, a support vector machine, or a random forest model;
    generating, using the one or more processors and based on (1) the elemental specification and (2) a translation specification associated with the target schema, second data structured according to the target schema and including (1) binary image data defining the image representation of the entity and (2) the feature matrix; and
    training a machine learning model, using the second data, to perform image recognition to predict, based on the binary image data, a feature from the plurality of features of the entity, the machine learning model having the machine learning model type defined by the elemental specification.

2. The method of claim 1, wherein:
    the entity is a first entity;
    the elemental specification further defines a relationship property defining a cardinality between the first entity and a second entity; and
    in response to the elemental specification defining the relationship property, the second data defines at least one of an object-oriented relationship associated with the first entity and the second entity, a graph relationship associated with the first entity and the second entity, or a network relationship associated with the first entity and the second entity.

3. The method of claim 1, wherein:
    the translation specification defines a plurality of mappings between the elemental specification and the target schema; and
    the translation specification includes (1) a structural translation matrix defining one or more mappings from the plurality of mappings, (2) a datatype translation matrix defining one or more mappings from the plurality of mappings, (3) a constraint translation matrix defining one or more mappings from the plurality of mappings, (4) a relationship translation matrix defining one or more mappings from the plurality of mappings, (5) a data security translation matrix defining one or more mappings from the plurality of mappings, and (6) a data indexing translation matrix defining one or more mappings from the plurality of mappings.

4. The method of claim 1, wherein the target schema is a first target schema, and the translation specification is a second translation specification, the method further comprising:
    receiving, at the one or more processors, an indication of a second target schema associated with an event-stream representation of the entity, the event-stream representation configured to transit between the event producer and the event consumer;
    generating, using the one or more processors and based on (1) the elemental specification and (2) a second translation specification associated with the second target schema, third data that is structured according to the second target schema and that includes the event-stream representation of the entity; and causing a portion of second data to be excluded from a modification while the event-stream representation of the entity is in transit between the event producer and the event consumer, based on an immutability property defined by the elemental specification.

5. The method of claim 1, wherein:
the data exchange is a RESTful data exchange.

6. The method of claim 1, wherein the entity is a first entity and the translation specification is a first translation specification, the method further comprising:
receiving, at the one or more processors, an indication of a second target schema that uses a graph query language to define a graph that includes a graph representation of the entity; and
generating, using the one or more processors and based on (1) the elemental specification and (2) a second translation specification associated with the second target schema, third data that is structured according to the second target schema and that includes the graph having the graph representation of the entity and defining a graph relationship between the first entity and a second entity included in the graph.

7. A non-transitory processor-readable medium storing code representing instructions to be executed by one or more processors, the instructions comprising code to cause the one or more processors to:
receive a first file that encodes first data according to a first file format, the first data representing a virtual entity;
receive an indication of an image file format;
generate a first specification document associated with the first data, the first specification document defining a machine learning property and a machine learning model type;
generate, based on the first specification document and a second specification document associated with the image file format, a second file that encodes second data according to the image file format, the second data including (1) binary image data representing the virtual entity and (2) a feature matrix having (a) a plurality of features of the virtual entity and (b) a plurality of observations for each feature from the plurality of features; and
train a machine learning model having the machine learning model type to perform image recognition to predict a feature of the virtual entity, based on the second data.

8. The non-transitory processor-readable medium of claim 7, wherein:
the generating the second file is performed using an executable program configured to query the first specification document and the second specification document.

9. The non-transitory processor-readable medium of claim 7, wherein:
the image file format is associated with a RESTful data exchange.

10. The non-transitory processor-readable medium of claim 7, wherein:
the machine learning model type is from a plurality of machine learning model types that includes at least one of a neural network type, a support vector machine type, a classifier type, or a random forest algorithm type.

11. The non-transitory processor-readable medium of claim 7, wherein the image file format is a first target file format, the instructions further comprise code to cause the one or more processors to:

receive an indication of a second target file format different from the first target file format; and
generate, based on the first specification document and a third specification document associated with the second target file format, a third file that encodes third data according to the second target file format, the third data representing the virtual entity and including the feature matrix associated with the virtual entity.

12. The non-transitory processor-readable medium of claim 7, wherein:
the first file format is associated with an in-transit representation of the virtual entity.

13. The non-transitory processor-readable medium of claim 7, wherein:
the first file format is associated with a relational database representation of the virtual entity.

14. A non-transitory processor-readable medium storing code representing instructions to be executed by one or more processors, the instructions comprising code to cause the one or more processors to:
receive a query that includes an indication of data representing an entity and an indication of an image file standard;
retrieve, from memory, an input file that includes the data and that is formatted according to an input file standard;
select a portion of the data, the portion of the data being less than an entirety of the data, based, at least in part, on one or more specification documents that indicate that the portion of the data complies with the image file standard;
generate, based on the one or more specification documents, binary image data that is excluded from the data and that is to be included in a target file that complies with the image file standard, the binary image data further complying with at least one property (1) defined by the one or more specification documents and (2) including (a) a feature matrix having (i) a plurality of features of the entity and (ii) a plurality of observations for each feature from the plurality of features and (b) a machine learning model type;
generate the target file that complies with the image file standard and that includes the portion of the data and the supplemental binary image data; and
train a machine learning model having the machine learning model type to perform image recognition to predict a feature of the entity from the plurality of features, based on the target file.

15. The non-transitory processor-readable medium of claim 14, further storing instructions to cause the one or more processors to:
receive a second query that includes the indication of the data and an indication of a target file standard;
select the portion of the data based, at least in part, on the one or more specification documents that indicate that the portion of the data complies with the target file standard;
generate, based on the one or more specification documents, supplemental data that is excluded from the data and that is to be included in a target file that complies with the target file standard; and
generate the target file that complies with the target file standard and that includes the portion of the data and the supplemental data.

16. The non-transitory processor-readable medium of claim 14, wherein:
the one or more specification documents include (1) a universal specification, (2) a first translation specification that defines a first plurality of mappings between first metadata associated with the universal specification and second metadata associated with the input file standard, and (3) a second translation specification that defines a second plurality of mappings between the first metadata associated with the universal specification and third metadata associated with the image file standard.

17. The non-transitory processor-readable medium of claim 14, wherein:
the code to receive includes code to receive an Application Programming Interface (API) call that includes the query.

18. The non-transitory processor-readable medium of claim 14, wherein:
the image file standard includes at least one of a JPEG format or a PNG format.

\* \* \* \* \*